(12) United States Patent
Yang et al.

(10) Patent No.: US 9,407,306 B2
(45) Date of Patent: Aug. 2, 2016

(54) QUADRATURE AMPLITUDE MODULATION FOR TIME-REVERSAL SYSTEMS

(71) Applicant: Origin Wireless, Inc., Boston, MA (US)

(72) Inventors: Yu-Han Yang, College Park, MD (US); Yan Chen, Greenbelt, MD (US); K. J. Ray Liu, Potomac, MD (US)

(73) Assignee: Origin Wireless, Inc., Greenbelt, MD (US)

( * ) Notice: Subject to any disclaimer, the term of this patent is extended or adjusted under 35 U.S.C. 154(b) by 0 days.

(21) Appl. No.: 14/262,153

(22) Filed: Apr. 25, 2014

(65) Prior Publication Data

US 2015/0312081 A1    Oct. 29, 2015

(51) Int. Cl.
 *H04L 27/36* (2006.01)
 *H04B 1/38* (2015.01)

(52) U.S. Cl.
 CPC ............... *H04B 1/38* (2013.01); *H04L 27/362* (2013.01)

(58) Field of Classification Search
 CPC ................ G01S 7/52049; H04L 2025/03802
 See application file for complete search history.

(56) References Cited

U.S. PATENT DOCUMENTS

| | | | |
|---|---|---|---|
| 2,933,702 A | 4/1960 | Bogert | |
| 3,767,855 A | 10/1973 | Ueno et al. | |
| 5,092,336 A | 3/1992 | Fink | |
| 5,155,742 A | 10/1992 | Ariyavisitakul et al. | |
| 5,428,999 A | 7/1995 | Fink | |
| 5,926,768 A | 7/1999 | Lewiner et al. | |
| 6,301,291 B1 | 10/2001 | Rouphael et al. | |
| 6,490,469 B2 | 12/2002 | Candy | |
| 6,862,326 B1 | 3/2005 | Eran et al. | |
| 7,362,815 B2 | 4/2008 | Lindskog et al. | |
| 7,440,766 B1 | 10/2008 | Tuovinen et al. | |
| 7,460,605 B2 | 12/2008 | Candy et al. | |
| 7,463,690 B2 | 12/2008 | Candy et al. | |
| 7,587,291 B1 | 9/2009 | Sarvazyan et al. | |
| 7,768,876 B2 | 8/2010 | Dahl et al. | |
| 8,195,112 B1 | 6/2012 | Zhang et al. | |
| 8,346,197 B2 | 1/2013 | Huy et al. | |
| 8,411,765 B2 | 4/2013 | Smith et al. | |
| 8,451,181 B2 | 5/2013 | Huy et al. | |
| 8,457,217 B2 | 6/2013 | Huy et al. | |
| 8,498,658 B2 | 7/2013 | Smith et al. | |

(Continued)

FOREIGN PATENT DOCUMENTS

EP       2 571 214 A1    11/2012
WO    WO 2007/031088    3/2007

(Continued)

OTHER PUBLICATIONS

U.S. Appl. No. 13/706,342, Yang et al.

(Continued)

*Primary Examiner* — Shuwang Liu
*Assistant Examiner* — Sung Ahn
(74) *Attorney, Agent, or Firm* — Fish & Richardson P.C.

(57) ABSTRACT

Time-reversal wireless communication includes: at a base station, receiving a probe signal from a terminal device; generating a signature waveform that is based on a time-reversed signal of a channel response signal derived from the probe signal; performing quadrature amplitude modulation (QAM) on a transmit signal to generate a quadrature amplitude modulated signal; and generating a transmission signal based on the quadrature amplitude modulated signal and the signature waveform.

26 Claims, 19 Drawing Sheets

(56) References Cited

U.S. PATENT DOCUMENTS

| | | |
|---|---|---|
| 8,593,998 B2 | 11/2013 | Huy et al. |
| 8,743,976 B2 | 6/2014 | Smith et al. |
| 8,792,396 B2 | 7/2014 | Huy et al. |
| 8,831,164 B2 | 9/2014 | Lu |
| 2001/0037075 A1 | 11/2001 | Candy |
| 2003/0138053 A1 | 7/2003 | Candy et al. |
| 2004/0156443 A1 | 8/2004 | Dent |
| 2006/0098746 A1 | 5/2006 | Candy et al. |
| 2006/0115031 A1 | 6/2006 | Lindskog et al. |
| 2007/0071077 A1 | 3/2007 | Yang |
| 2008/0257660 A1* | 10/2008 | Miller ............... F16D 65/18 188/72.1 |
| 2010/0302977 A1 | 12/2010 | Huy et al. |
| 2010/0309829 A1 | 12/2010 | Huy et al. |
| 2011/0002371 A1* | 1/2011 | Forenza ............. H04B 7/0417 375/227 |
| 2011/0211520 A1* | 9/2011 | Gerstenberger .... H04L 27/3405 370/312 |
| 2012/0155515 A1* | 6/2012 | Smith ............... H04L 25/03834 375/219 |
| 2012/0183037 A1 | 7/2012 | Allpress et al. |
| 2012/0207234 A1 | 8/2012 | de Rosny et al. |
| 2012/0257660 A1* | 10/2012 | Smith .................. H04B 7/24 375/224 |
| 2012/0263056 A1 | 10/2012 | Smith et al. |
| 2012/0269234 A1* | 10/2012 | Zhang ................ H04L 5/0007 375/143 |
| 2012/0314786 A1* | 12/2012 | Atungsiri ........... H04L 27/3488 375/260 |
| 2012/0328037 A1 | 12/2012 | Hsu et al. |
| 2013/0201958 A1 | 8/2013 | Huy et al. |
| 2013/0223503 A1 | 8/2013 | Smith et al. |
| 2014/0022128 A1 | 1/2014 | Smith |
| 2014/0126567 A1 | 5/2014 | Husain et al. |
| 2014/0185596 A1 | 7/2014 | Han et al. |
| 2015/0049745 A1 | 2/2015 | Han et al. |
| 2015/0049792 A1 | 2/2015 | Han et al. |
| 2015/0236848 A1 | 8/2015 | Ma et al. |
| 2015/0257167 A1 | 9/2015 | Chen et al. |
| 2016/0018508 A1 | 1/2016 | Chen et al. |

FOREIGN PATENT DOCUMENTS

| | | |
|---|---|---|
| WO | WO 2011/029072 | 3/2011 |
| WO | WO 2011/029075 | 3/2011 |
| WO | WO 2012/151316 | 11/2012 |
| WO | WO 2013/126054 | 8/2013 |

OTHER PUBLICATIONS

U.S. Appl. No. 14/183,648, Ma et al.

U.S. Appl. No. 14/202,651, Chen et al.

Abbasi-Moghadam, D. and V.T. Vakili, "A SIMO one-bit time reversal for UWB communication systems", EURASIP J. Wireless Comm. and Networking, 2012:113, 2012.

Albert, D., L. Liu, M. L. Moran, "Time Reversal processing for source location in an urban environment (L)", J. Acoust. Soc. Am., vol. 118, No. 2, pp. 616-619, Aug. 2005.

Brysev, A.P., L.M. Krutyanskii, V'L. Preobrazhenskii, "Wave Phase Conjugation in ultrasonic beams", Physics-Uspekhi, vol. 41, No. 8, pp. 793-805, 1998.

Chang, Y.H., S.H. Tsai, X. Yu, C.C. J. Kuo, "Ultrawideband Transceiver Design Using Channel Phase Precoding", IEEE Trans. Sig. Proc., vol. 55, No. 7, pp. 3807-3822, Jul. 2007.

Chen, Y. et al., "Time-reversal wideband communications," IEEE Signal Processing Letters, vol. 20(12):1219-1222 (Dec. 2013).

Chen, Y., F. Han, Y.H. Yang, H. Ma, Y. Han, C. Jiang, H.Q. Lai, D. Claffey, Z. Safar, K.J.R. Liu, "Time-Reversal Wireless Paradigm for Green Internet of Things: An Overview", IEEE Internet of Things Journal, vol. 1, No. 1, Feb. 2014.

Daniels, R.C. and R. W. Heath, "Improving on time-reversal with MISO precoding," in the Proceedings IWC/WPMC, Aalborg, Denmark, Sep. 2005.

Daniels, R.C. and R. W. Heath, "MISO precoding for temporal and spatial focusing" in the Proceedings of the Eighth International Symposium on Wireless Personal Communications Conference, Aalborg, Denmark, 2005.

de Rosny, J., G. Lerosey and M. Fink, "Theory of Electromagnetic Time-Reversal Mirrors", IEEE Trans. Antennas Propag., vol. 58, No. 10, pp. 3139-3149, Oct. 2010.

Derode, A., A. Tourin, and M. Fink, "Ultrasonic pulse compression with one-bit time reversal through multiple scattering", J. Appl. Phys., vol. 85, No. 9, pp. 6343-6352, May 1999.

Derode, A., A. Tourin, J. de Rosny, M. Tanter, S. Yon, and M. Fink, "Taking Advantage of Multiple Scattering to Communicate with Time-Reversal Antennas", Phys. Rev. Lett., vol. 90, No. 1, 014301, Jan. 2003.

Derode, A., P. Roux, and M. Fink, "Robust Acoustic Time Reversal and High-Order Multiple Scattering", Phys. Rev. Lett., vol. 75, No. 23, pp. 4206-4210, Dec. 1995.

Dorme, C. and M. Fink, "Focusing in transmit-receive mode through inhomogeneous media: The time reversal matched filter approach", J. Acoust. Soc. Am., vol. 98, Pt. 1, pp. 1155-1162, Aug. 1995.

Edelmann, G.F., T. Akal, W.S. Hodgkiss, S. Kim, W.A. Kuperman and H.C. Song, "An Initial Demonstration of Underwater Acoustic Communication Using Time Reversal", IEEE J. Ocean Eng., vol. 27, No. 3, Jul. 2002.

Emami et al., "Matched Filtering with Rate Back-off for Low Complexity Communications in Very Large Delay Spread Channels," 38th Asilomar Conference on Signals, Systems and Computers, pp. 218-222, 2004.

Emami, S.M., J. Hansen, A.D. Kim, G Papanicolaou, A.J. Paulraj, D. Cheung, C. Prettie, "Predicted Time Reversal Performance in Wireless Communications using Channel Measurements", publication details unknown.

F. Han, "Energy Efficient Optimization in Green Wireless Networks", University of Maryland Ph. D. Dissertation, 2013.

Fink, M. and C. Prada, "Acoustic Time-Reversal Mirrors", Inverse Problems, vol. 17, pp. R1-R38, 2001.

Fink, M., "Time Reversal of Ultrasonic Fields—Part I: Basic Principals", IEEE Trans. Ultrasonics, Ferroelectrics and Freq. Contr., vol. 39, No. 5, pp. 555-566, Sep. 1992.

Fink, M., "Time-Reversal Mirrors", J. Phys. D: Appl. Phys., vol. 26, pp. 1333-1350, 1993.

Fink, M., "Time-Reversed Acoustics", Scientific American, pp. 91-97, Nov. 1999.

Fink, M., C. Prada, F. Wu, and D. Cassereau, "Self focusing in inhomogeneous media with time reversal acoustic mirrors," IEEE Ultrasonics Symposium, vol. 1, pp. 681-686, 1989.

Fontana, R.J., S.J. Gunderson, "Ultra-Wideband Precision Asset Location System", Proc. of the IEEE Conf. on UWB Sys. and Tech., pp. 147-150, 2002.

Guo, N., B.M. Sadler and R.C. Qiu, "Reduced-Complexity UWB Time-Reversal Techniques and Experimental Results", IEEE Trans. on Wireless Comm., vol. 6, No. 12, Dec. 2007.

Han, F. and K.J.R. Liu, "A multiuser TRDMA uplink system with 2D parallel interference cancellation," IEEE Transactions on Communications, vol. 62(3):1011-1022 (Mar. 2014).

Han, F. and K.J.R. Liu, "An Interference Cancellation Scheme for the Multiuser TRDMA Uplink System," Global Telecommunications Conference, pp. 3583-3588 (2013).

Han, F., Y.H. Yang, B. Wang, Y. Wu, K.J.R. Liu, "Time-reversal division multiple access in multi-path channels," Global Telecommunications Conference, pp. 1-5 (2011).

Han, F., Y.H. Yang, B. Wang, Y. Wu, K.J.R. Liu, "Time-reversal division multiple access over multi-path channels," IEEE Transactions on Communications, vol. 60(7):1953-1965 (Jul. 2012).

Henty, B.E. and D.D. Stancil, "Multipath-Enabled Super-Resolution for RF and Microwave Communication using Phase-Conjugate Arrays", Phys. Rev. Lett., vol. 93, 243904, Dec. 2004.

Jin, JY. and .M.F. Moura, "Time Reversal Detection Using Antenna Arrays", IEEE Trans. on Signal Process., vol. 57, No. 4, Apr. 2009.

Khalegi, A., G. El Zein and I. Navqi, "Demonstration of Time-Reversal in Indoor Ultra-Wideband Communication: Time Domain Measurement", IEEE Proc. of ISWCS, pp. 465-468, 2007.

(56) References Cited

OTHER PUBLICATIONS

Kuperman, W.A., W.S. Hodgkiss, H.C. Song, T. Akal, C. Ferla, D.R. Jackson, "Phase conjugation in the ocean: Experimental demonstration pf an acoustic time-reversal mirror", J. Acoust. Soc. Am., vol. 103, No. 1, pp. 25-40, Jan. 1998.
Kyritsi, P. and G. Papanicolau, "One-bit Time Reversal for WLAN Applications", IEEE 16th Intern. Symp. on Personal, Indoor and Mobile Radio Comm., pp. 532-536, 2005.
Kyritsi, P. et al., "Time reversal and zero-forcing equalization for fixed wireless access channels," 39th Asilomar Conference on Signals, Systems and Computers, pp. 1297-1301 (2005).
Kyritsi, P. et al., "Time reversal techniques for wireless communications," IEEE Vehicular Technology Conference, vol. 1:47-51 (2004).
Lemoult, F., G. Lerosey, J. de Rosny, and M. Fink, "Manipulating Spatiotemporal Degrees of Freedom in Waves of Random Media", Phys. Rev. Lett., vol. 103, 173902, Oct. 2009.
Lemoult, F., G. Lerosey, J. de Rosny, and M. Fink, "Resonant Metalenses for Breaking the Diffraction Barrier", Phys. Rev. Lett., vol. 104, 203901, May 2010.
Lerosey, G., J. de Rosny, A. Tourin, A. Derode, G. Montaldo and M. Fink, "Time Reversal of Electromagnetic Waves", Phys. Rev. Lett., vol. 92, No. 19, 193904, May 2004.
Lerosey, G., J. de Rosny, A. Tourin, A. Derode, G. Montaldo and M. Fink, "Time Reversal of Electromagnetic Waves and Telecommunication", Radio Science, vol. 40, RS6S12, 2005.
Lerosey, G., J. de Rosny, A. Tourin, A. Derode, M. Fink, "Time Reversal of Wideband Microwaves", Appl. Phys. Lett., vol. 88, 154101, Apr. 2006.
Lerosey, G., J. de Rosny, A. Tourin, and M. Fink, "Focusing beyond the diffraction limit with far-field time reversal", Science, vol. 315, pp. 1120-1122, Feb. 2007.
Lienard, M. et al., "Focusing gain model of time-reversed signals in dense multipath channels," IEEE Antennas and Wireless Propagation Letters, vol. 11:1064-1067 ( 2012).
Ma, H., F. Han, and K.J.R. Liu, "Interference-Mitigating Broadband Secondary User Downlink System: A Time-Reversal Solution", Global Telecommunications Conference, pp. 884-889, (2013).
Montaldo, G., G. Lerosey, A. Derode, A. Tourin, J. de Rosny, and M. Fink, "Telecommunication in a disordered environment with iterative time reversal," Waves Random Media, vol. 14, pp. 287-302, May 2004.
Moura, J.M.F. and Y. Jin, "Detection by Time Reversal: Single Antenna", IEEE Trans. on Signal Process., vol. 55, No. 1, Jan. 2007.
Moura, J.M.F. and Y. Jin, "Time Reversal Imaging by Adaptive Interference Canceling", IEEE Trans. on Signal Process., vol. 56, No. 1, Jan. 2008.
Naqvi, I.H., A. Khaleghi and G. El Zein, "Performance Enhancement of Multiuser Time Reversal UWB Communication System", Proc. of IEEE ISWCS, pp. 567-571, 2007.
Naqvi, I.H., G. El Zein, G. Lerosey, J. de Rosny, P. Besnier, A. Tourin, M. Fink, "Experimental validation of time reversal ultra wide-band communication system for high data rates", IET Microw. Antennas Propag., vol. 4, Iss. 5, pp. 643-650, 2010.
Naqvi, I.H., P. Besnier and G. El Zein, "Effects of Time Variant Channel on a Time Reversal UWB System", Global Telecommunications Conference, (2009).
Nguyen, H. T. et al., "A time reversal transmission approach for multiuser UWB communications," IEEE Transactions on Antennas and Propagation, vol. 54: 3216-3224 (Nov. 2006).
Nguyen, H. T., "On the performance of one bit time reversal for multi-user wireless communications", IEEE Proc. of ISWCS, pp. 672-676, 2007.
Nguyen, H., F. Zheng, and T. Kaiser, "Antenna Selection for Time Reversal MIMO UWB Systems", IEEE Vehicle Technology Conference, pp. 1-5, 2009.
Nguyen, H., Z. Zhao, F. Zheng and T. Kaiser, "On the MSI Mitigation for MIMO UWB Time Reversal Systems", Proc. of IEEE International Conference on Ultra-Wideband, pp. 295-299, 2009.
Nguyen, H., Z. Zhao, F. Zheng, and T. Kaiser, "Preequalizer Design for Spatial Multiplexing SIMO-UWB TR Systems", IEEE Trans. on Vehicular Tech., vol. 59, No. 8, Oct. 2010.
Nguyen, H.T., "Partial one bit time reversal for UWB impulse radio multi-user communications", IEEE Proc. of ICCE, 2008.
Nguyen, T.K., H. Nguyen, F. Zheng and T. Kaiser, "Spatial Correlation in SM-MIMO-UWB Systems Using a Pre-Equalizer and Pre-Rake Filter", Proc. of IEEE International Conference on Ultra-Wideband, pp. 1-4, 2010.
Nguyen, T.K., H. Nguyen, F. Zheng, and T. Kaiser, "Spatial Correlation in the Broadcast MU-MIMO UWB System Using a Pre-Equalizer and Time Reversal Pre-Filter", Proc. of IEEE ICPCS, 2010.
Oestges, C., A.D. Kim, G. Papanicolaou, and A.J. Paulraj, "Characterization of Space-Time Focusing in Time Reversed Random Fields", IEEE Trans. Antennas and Propag., pp. 1-9, 2005.
Parvulescu, A. and Clay, C. S., "Reproducibility of Signal Transmissions in the Ocean", The Radio and Electronic Engineer, pp. 223-228, Apr. 1965.
Phan-Huy, D. T., S.B. Halima, M. Helard, "Frequency Division Duplex Time Reversal", Global Telecommunications Conference, (2011).
Porcino, D., "Ultra-Wideband Radio Technology: Potential and Challenges Ahead", IEEE Communications Mag., pp. 66-74, Jul. 2003.
Prada, C., F. Wu, and M. Fink, "The iterative time reversal mirror: A solution to self-focusing in the pulse echo mode," J. Acoustic Society of America, vol. 90, pp. 1119-1129, 1991.
Price, R., "A Communication Technique for Multipath Channels", Proceeding of the IRE, vol.
Qiu, R. C. et al., "Time reversal with miso for ultra-wideband communications: Experimental results," IEEE Antenna and Wireless Propagation Letters, vol. 5:269-273 (2006).
Rode, J. P., M.J. Hsu, D. Smith and A. Hussain, "Collaborative Beamfocusing Radio (COBRA)", Proc. of SPIE, vol. 8753, pp. 87530J-1-87530J-11, 2013.
Rouseff, D., D.R. Jackson, W.L.J. Fox, C.D. Jones, J.A. Ritcey, and D.R. Dowling, "Underwater Acoustic Communication by Passive-Phase Conjugation: Theory and Experimental Results", IEEE J. Oceanic Eng., vol. 26, No. 4, pp. 821-831, Oct. 2001.
Saghir, H., M. Heddebaut, F. Elbahhar, A. Rivenq, J.M. Rouvaen, "Time-Reversal UWB Wireless Communication-Based Train Control in Tunnel", J. of Comm., vol. 4, No. 4, pp. 248-256, May 2009.
Song, H. C., W.A. Kuperman, W.S. Hodgkiss, T. Akal, and C. Ferla, "Iterative time reversal on the ocean", J. Acoust. Soc. Am, vol. 105, No. 6, pp. 3176-3184, Jun. 1999.
Song, H. C., W.S. Hodgkiss, W.A. Kuperman, T. Akal, and M. Stevenson, "Multiuser Communications Using Passive Time Reversal", IEEE J. Oceanic Eng., vol. 32, No. 4, pp. 915-926, Oct. 2007.
Strohmer, T., M. Emami, J. Hansen, G. Papanicolaou and A.J. Paulraj, "Application of Time-Reversal with MMSE Equalizer to UWB Communications", Global Telecommunications Conference, pp. 3123-3127, (2004).
Wang, B. et al., "Green wireless communications: A time-reversal paradigm," IEEE Journal of Selected Areas in Communications, vol. 29:1698-1710 (2011).
Wu, F., J.L. Thomas, and M. Fink, "Time Reversal of Ultrasonic Fields—Part II: Experimental Results", IEEE Trans. Ultrasonics, Ferroelectrics and Freq. Contr., vol. 39, No. 5, pp. 567-578, Sep. 1992.
Xiao, S. Q., J. Chen, B.Z. Wang, and X.F. Liu, "A Numerical Study on Time-Reversal Electromagnetic Wave for Indoor Ultra-Wideband Signal Transmission", Progress in Electromagnetics Research, PIER 77, pp. 329-342, 2007.
Yang, Y. H., "Waveform Design and Network Selection in Wideband Small Cell Networks", University of Maryland Ph. D. Thesis, 2013.
Yang, Y. H., B. Wang and K.J.R. Liu, "Waveform Design for Sum Rate Optimization in Time-Reversal Multiuser Downlink Systems", Global Telecommunications Conference, (2011).
Yang, Yu-Han et al., "Near-optimal waveform design for sum rate optimization in time-reversal multiuser downlink systems," vol. 12(1):346-357 (Jan. 2013).
Yuanwei, Jin et al., "Adaptive time reversal beamforming in dense multipath communication networks," 2008 42nd Asilomar Conference on Signals, Systems and Computers, pp. 2027-2031 (Oct. 2008).
Zhou, X., P.C.F. Eggers, P. Kyritsi, J.B. Andersen, G.F. Pedersen and J.O. Nilsen, "Spatial Focusing and Interference Reduction using MISO Time Reversal in an Indoor Application", IEEE Proc. of SSP, pp. 307-311, 2007.
Han, Y., Chen, Y., and Liu, K.J.R, 'Time-Reversal with Limited Signature Precision: Tradeoff Between Complexity and Perfor-

(56) References Cited

OTHER PUBLICATIONS mance', Proc. IEEE Global Conference on Signal and Information Processing (GlobalSIP), Atlanta, Dec. 2014.

Pitarokoilis, A., Mohammed, S. K., Larsson, E.G., "Uplink performance of time-reversal MRC in massive MIMO systems subject to phase noise", IEEE Trans. Wireless Communications, pp. 711-723, Sep. 2014.

Viteri-Mera, C. A., Teixeira, F. L., "Interference-Nulling Time-Reversal Beamforming for mm-Wave Massive MIMO in Multi-User Frequency-Selective Indoor Channels", arXiv:1506.05143[cs.IT], Jun. 18, 2015.

Wu, Z.H., Han, Y., Chen, Y., and Liu, K.J.R., "A Time-Reversal Paradigm for Indoor Positioning System", IEEE Transactions on Vehicular Technology, vol. 64(4):1331-1339, special section on Indoor localization, tracking, and mapping with heterogeneous technologies, Apr. 2015.

Yang, Yu-Han et al., "Waveform Design for Time-Reversal Systems", U.S. Appl. No. 13/706,342, filed Dec. 5, 2012, 86 pages.

\* cited by examiner

QUADRATURE AMPLITUDE MODULATION FOR TIME-REVERSAL SYSTEMS

TECHNICAL FIELD

This disclosure generally relates to quadrature amplitude modulation for time-reversal wireless systems.

BACKGROUND

A time-reversal division multiple access (TRDMA) system provides a cost-effective single-carrier technology for broadband communications and at the same time leverages the degrees of freedom in a large number of multi-paths to form a unique high-resolution spatial focusing effect. In some time-reversal communication systems, when a transceiver A intends to transmit information to a transceiver B, transceiver B first sends a delta-like pilot pulse that propagates through a scattering and multi-path environment, and the signals are received by transceiver A. Transceiver A transmits time-reversed signals back through the same channel to transceiver B. Based on channel reciprocity, a time-reversal communication system leverages the multi-path channel as a matched filter, i.e., treats the environment as a facilitating matched filter computing machine, and focuses the wave at the receiver in both space and time domains.

SUMMARY

In general, in one aspect, a method for time-reversal wireless communication includes at a base station, receiving a probe signal from a terminal device; generating a signature waveform that is based on a channel response signal derived from the probe signal; performing quadrature amplitude modulation (QAM) on a transmit signal to generate a quadrature amplitude modulated signal; and generating a transmission signal based on the quadrature amplitude modulated signal and the signature waveform.

Implementations of the method may include one or more of the following features. Performing quadrature amplitude modulation on the transmit signal can include dividing the transmit signal into a first part and a second part, applying amplitude modulation on the first part to generate an in-phase part of the quadrature amplitude modulated signal, and applying amplitude modulation on the second part to generate a quadrature part of the quadrature amplitude modulated signal. The signature waveform can include a complex signal having a real part and an imaginary part. Generating a signature waveform can include generating a signature waveform based on a time-reversed signal of the channel response signal. Generating the transmission signal can include performing a convolution of the signature waveform and the quadrature amplitude modulated signal or a modified version of the quadrature amplitude modulated signal. The modified version of the quadrature amplitude modulated signal can include an up-sampled version of the quadrature amplitude modulated signal, and generating the transmission signal can include performing a convolution of the signature waveform and the up-sampled version of the quadrature amplitude modulated signal. The transmit signal can include a digital transmit signal. Performing the quadrature amplitude modulation can include encoding data bits of the transmit signal based on Gray codes, and mapping Gray-coded data bits to quadrature amplitude modulated symbols. Generating the signature waveform can include generating a signature waveform that is a time-reversed conjugate signal of the channel response signal. Performing quadrature amplitude modulation on a transmit signal can include performing 4 QAM, 16 QAM, 64 QAM, or 256 QAM.

In general, in another aspect, a method for time-reversal wireless communication includes performing quadrature amplitude modulation on a first transmit signal to generate a first quadrature amplitude modulated signal; performing quadrature amplitude modulation on a second transmit signal to generate a second quadrature amplitude modulated signal; generating a first transmission signal based on the first quadrature amplitude modulated signal and a first signature waveform associated with a first terminal device; generating a second transmission signal based on the second quadrature amplitude modulated signal and a second signature waveform associated with a second terminal device; and generating a combined transmission signal by adding a real part of the first transmission signal with a real part of the second transmission signal to generate an in-phase part of the combined transmission signal, and adding an imaginary part of the first transmission signal with an imaginary part of the second transmission signal to generate a quadrature part of the combined transmission signal.

Implementations of the method may include one or more of the following features. The method can include receiving a first probe signal from the first terminal device; and generating the first signature waveform based on a time-reversed signal of a first channel response signal derived from the first probe signal. Generating the first signature waveform can include generating a first signature waveform that is a time-reversed conjugate signal of the first channel response signal. Performing quadrature amplitude modulation on the first transmit signal can include dividing the first transmit signal into a first part and a second part, applying amplitude modulation on the first part to generate an in-phase part of the first quadrature amplitude modulated signal, and applying amplitude modulation on the second part to generate a quadrature part of the first quadrature amplitude modulated signal. The first signature waveform can include a complex signal having a real part and an imaginary part. Generating the first transmission signal can include performing a convolution of the first signature waveform and the first quadrature amplitude modulated signal or a modified version of the first quadrature amplitude modulated signal. The modified version of the first quadrature amplitude modulated signal can include an up-sampled version of the first quadrature amplitude modulated signal, and generating the first transmission signal can include performing a convolution of the first signature waveform and the up-sampled version of the first quadrature amplitude modulated signal. The transmit signal can include a digital transmit signal. Performing the quadrature amplitude modulation can include encoding data bits of the transmit signal based on Gray codes, and mapping Gray-coded data bits to quadrature amplitude modulated symbols. Performing quadrature amplitude modulation on a transmit signal can include performing 4-QAM, 16-QAM, 64-QAM, or 256-QAM.

In general, in another aspect, a system for time-reversal wireless communication includes a first device that includes an input circuit configured to receive a probe signal transmitted wirelessly from a second device through multiple propagation paths, and a data processor. The data processor is configured to generate a signature waveform that is based on a channel response signal derived from the probe signal; perform quadrature amplitude modulation (QAM) on a transmit signal to generate a quadrature amplitude modulated signal; and generate a transmission signal based on the quadrature amplitude modulated signal and the signature waveform.

Implementations of the system may include one or more of the following features. The transmit signal can be divided into a first part and a second part, amplitude modulation can be applied on the first part to generate an in-phase part of the quadrature amplitude modulated signal, and amplitude modulation can be applied on the second part to generate a quadrature part of the quadrature amplitude modulated signal. The signature waveform can include a complex signal having a real part and an imaginary part. The data processor can be configured to generate the signature waveform based on a time-reversed signal of the channel response signal. A convolution of the signature waveform and the quadrature amplitude modulated signal or a modified version of the quadrature amplitude modulated signal can be performed. The modified version of the quadrature amplitude modulated signal can include an up-sampled version of the quadrature amplitude modulated signal, and a convolution of the signature waveform and the up-sampled version of the quadrature amplitude modulated signal can be performed. The transmit signal can include a digital transmit signal. Data bits of the transmit signal can be encoded based on Gray codes, and Gray-coded data bits can be mapped to quadrature amplitude modulated symbols. A signature waveform that is a time-reversed conjugate signal of the channel response signal can be generated. 4 QAM, 16 QAM, 64 QAM, or 256 QAM can be performed on the transmit signal.

The methods and systems described above can be implemented in various devices and systems, e.g., mobile phones, vehicles (e.g., cars, ships, airplanes), robots, unmanned aerial vehicles, thermostats, refrigerators, lighting control systems, personal desktop computers, laptop computers, tablet computers, network routers, and televisions.

The details of one or more implementations of time-reversal wireless communication systems are set forth in the accompanying drawings and the description below. Other features, aspects, and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
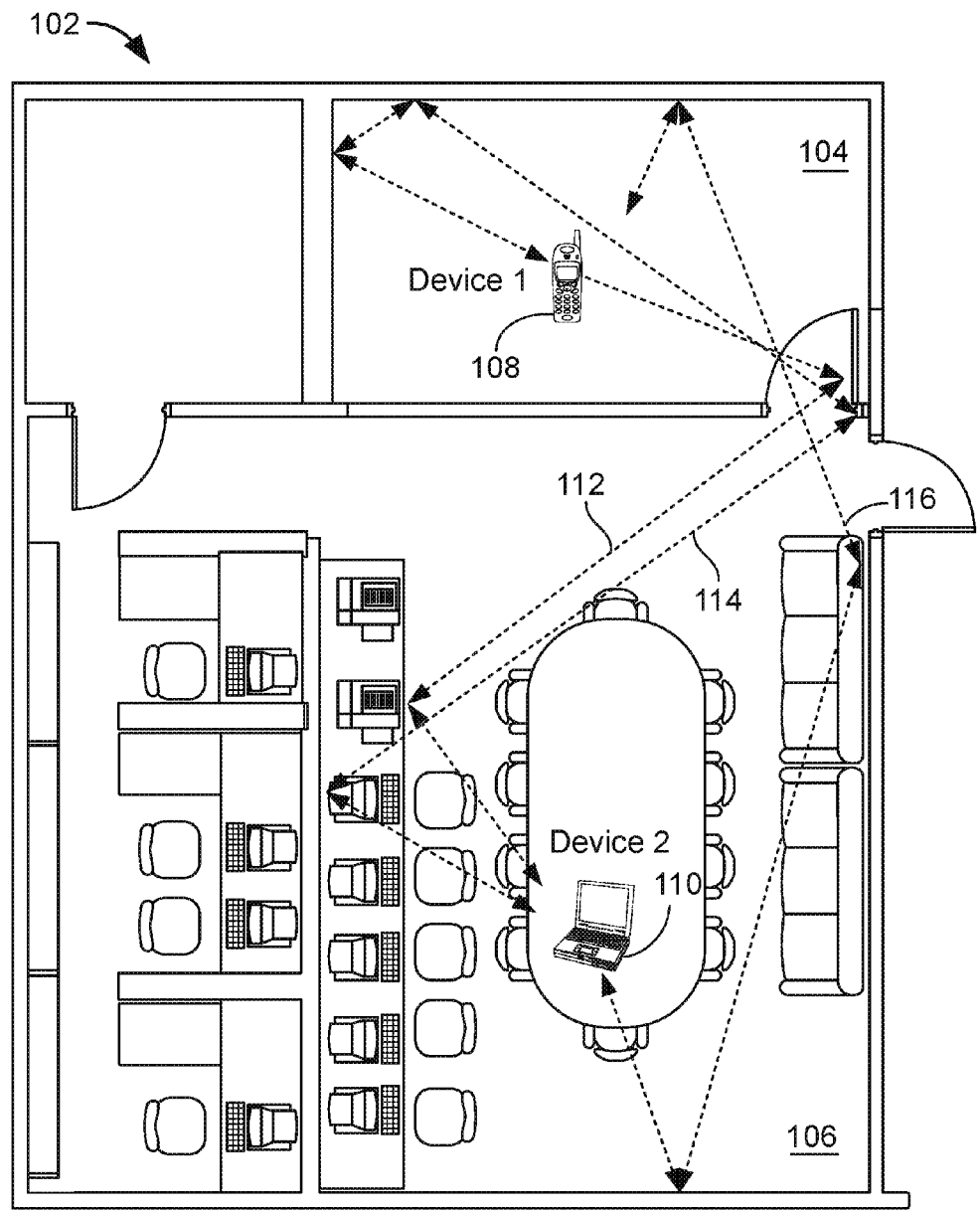
FIG. 1 is a diagram showing an exemplary environment for operating a time-reversal system.

This disclosure describes a novel time-reversal wireless communication system that uses quadrature amplitude modulation. In time-reversal communication systems, information bits are modulated into symbols, and the symbols are then modulated by transmit waveforms for transmission. By utilizing channel reciprocity, the time-reversal waveforms can collect much of the energy in the multipath channel, resulting in a temporally spiky signal power focused at the intended receiver. Quadrature amplitude modulation (QAM) maps two digital bit-streams into an analog complex symbol-stream for transmission. Each bit-stream is modulated by amplitude modulation, and the two amplitude-modulated symbol-streams are then combined into one complex symbol-stream. The information of the digital bits is carried by both the amplitude and the phase of the complex symbol-stream. In the following, we describe a transceiver architecture incorporating quadrature amplitude modulation in time-reversal systems with arbitrary transmit waveforms.

In this description, depending on context, the term "user" may refer to a device. For example, in a system that has multiple devices communicating with a base station, the term "multi-user uplink" refers to the uplink by multiple devices, and the term "inter-user interference" refers to the interference among various devices. The time-reversal division multiple access technology has a wide variety of applications. For example, an intelligent house may include one or more computers that communicate wirelessly with several sensors (e.g., temperature, humidity, light, and motion sensors), meters (e.g., electricity and water meters), appliances (e.g., refrigerator, oven, washing machine), electronic devices (e.g., television, digital video recorder, audio/video system, telephone, digital photo album, intelligent lamp, security system), climate control systems (e.g., fans, thermostats for air conditioning and heating, motorized shades), power generators (e.g., backyard wind turbine, solar panel, geothermal energy system). A home lighting system may include a controller that controls intelligent light bulbs (e.g., bulbs that use light emitting diodes (LED) or laser technology) to adjust color and/or brightness of the bulbs. The controller may communicate with the intelligent bulbs using time-reversal wireless communication. The communication module at the light bulb using time-reversal technology can be made at a lower cost compared to, e.g., a communication module using Wi-Fi or Bluetooth technology. Thermostat controllers, smoke detectors, security systems, and phone systems may communicate with one another using time-reversal communication technology. For example, a smoke/carbon monoxide detector that detects smoke or carbon monoxide may communicate with the thermostat to shut off the boiler, communicate with a home security system that notifies the fire department, or communicate with a phone system that sends an alert text or voice message or e-mail to the home owner. The smoke detector may have motion sensors that can detect the presence of people, and may announce voice messages in case of emergency. For example, if a home has smoke detectors installed at several locations, a first smoke detector that detects smoke in the first floor kitchen may communicate with a second smoke detector located on the third floor bedroom where a home owner is sleeping to cause the second smoke detector to broadcast an announcement alerting the home owner that smoke is detected in the first floor kitchen.

A home or office may have multiple devices that have clocks. The devices may communicate with a controller that provides an accurate time signal so that all the devices in the home or office can be synchronized. The controller can provide the time signals to the various devices using time-reversal wireless communication.

Plant care (e.g., in a greenhouse, home, or office building) may be partially automated by use of sensors that sense soil conditions and provide information to indicate whether watering or fertilization is needed, the amount of water and fertilizer required, and the type of fertilizer needed. For example, a plant care module may be inserted into the soil or planting medium adjacent to each plant, in which the plant care module may have a storage that stores information about the plant, such as the type of plant, the level of moisture that should be maintained, and how often and what type of fertilizers need to be applied, the date and time in which water or fertilizer was applied, and the type and amount of fertilizer applied. The plant care module may have sensors that sense the soil conditions and a communication module to communicate with an automated plant care system, such as a robot that can provide water and fertilizers based on the information sent from the plant care module. The plant care module can communicate with a lighting system that controls the amount of light provided to the plant and a temperature control system that controls the temperature in the vicinity of the plant. For example, the communication module can use time-reversal wireless communication technology that requires little power, and the plant care modules can be powered by solar cells to eliminate the need to change batteries.

Vehicles may have time-reversal wireless communication modules that communicate with various sensors, beacons, or data processing modules in garages, driveways, or buildings. For example, garages may be retrofitted with sensors and beacons to assist vehicles (e.g., autonomous vehicles) to find and park into parking spaces. Robots may have time-reversal wireless communication modules that communicate with various sensors, beacons, or data processing modules in homes or office buildings to assist in navigation or to provide information about the environmental conditions or other information (e.g., tasks that need to be performed at particular locations). As discussed below, time-reversal wireless communication has an asymmetrical nature in which the base station performs most of the signal processing as both a transmitter (for the downlink) and receiver (for the uplink), allowing the use of low complexity terminal devices. Thus, a large number of terminal devices (e.g., sensors) can be deployed at a low cost. Because the terminal devices require little power, they can be powered by solar cells or piezoelectric components to eliminate the need to recharge batteries, or be power by batteries that last for a long lifetime.

In an assembly plant, critical components may have embedded processors that store and process data and communicate with one or more external controllers using time-reversal wireless communication technology to ensure that the critical components function properly, and have been properly processed in previous stages before moving to the next stage. For example, an engine of a vehicle can have an embedded module having a data processor and storage that stores information about all the tests that have been performed in previous stages before being assembled with the car chassis. An airplane may be assembled from components manufactured by companies in different countries. Each component can have an embedded module that has a data processor and storage that stores information about the component, such as characteristics of the components and results of tests that have been performed on the component. The embedded modules may communicate with one or more external controllers using time-reversal wireless communication technology. Use of such embedded modules can increase the quality of the final products by ensuring that each component has been properly processed and tested.

In some examples, a controller may communicate with multiple sensors or devices using time-reversal wireless communication, and communicate with other devices using other communication protocols. For example, a controller may communicate with intelligent light bulbs, temperature sensors, and power meters using time-reversal wireless communication, and communicate with a smart phone using Wi-Fi communication. The controller serves as a bridge between devices that use low cost time-reversal communication modules and devices (e.g., smart phones or network routers) that follow Wi-Fi or Bluetooth communication protocols.

For example, an intelligent factory may include one or more computers that communicate wirelessly with robots working in assembly lines, vehicles that move supplies and assembled products, climate control systems, security systems, inventory control systems, and power systems. For example, a laboratory may include one or more computers that communicate wirelessly with instruments that monitor parameters when conducting experiments.

In the examples above, the computer (or controller) can communicate with the devices using time-reversal division multiple access technology that uses the environment to provide spatial filtering, allowing a large number of devices to communicate with the computers simultaneously. Compared to using previous wireless communication technologies, such as Wi-Fi or Bluetooth, time-reversal division multiple access has the advantage that the additional cost for enabling each device to communicate with the computer (or controller) is small because the device itself does not need to perform complicated signal processing. Most of the signal processing is performed at the computer (or controller). The power consumption by each device for enabling wireless communication is also much smaller compared to previous wireless technologies.

For example, a swarm of robots and/or unmanned aerial vehicles (drones) can communicate wirelessly with each other using time-reversal division multiple access technology. For example, some of the robots and/or drones can function as controllers that perform more complicated signal processing, while the other robots and/or drones function as terminal devices that do not need to perform the complicated signal processing, For rescue robots working in disaster situations, such as in partially collapsed buildings or underground tunnels, multi-path interference may be especially severe for conventional wireless technologies based on, e.g., Wi-Fi or Bluetooth. The multiple signal paths can be used advantageously by time-reversal division multiple access technology, in which the environment provides spatial filtering. For small aerial drones that have small batteries or use solar power, reducing the energy required for wireless communication will allow the energy to be used elsewhere, such as increasing the flight time of the drones.

For example, wearable devices can communicate wirelessly with each other and/or with a controller using time-reversal division multiple access technology. For example, wearable energy generating devices (such as piezoelectric power generators) can be integrated into clothing and/or shoes, and used to provide power to sensors that monitor body parameters. For example, the sensors can be used to measure respiratory patterns, heart beat patterns, walking/running patterns, and/or sleeping patterns. The sensors can wirelessly send measured data to a controller (e.g., smart phone or computer) that processes the collected data. The processed data can be presented in a user-friendly graphical interface. Because time-reversal division multiple access technology requires very little power, the wearable sensors can be powered by the energy generated by the movements of the body (e.g., using piezoelectric components). In some examples, the wearable energy generating devices charge a rechargeable battery, which in turn powers the sensors. In that case, use of time-reversal division multiple access technology removes the requirement to recharge the battery through external power sources, or increases the time duration between recharging. Because time-reversal division multiple access technology requires less power than other communication technologies such as Wi-Fi or Bluetooth, there may be less side effects on the human body due to exposure to electromagnetic signals.

The time-reversal division multiple access scheme uses the multi-path channel profile associated with each user's location as a location-specific signature for the user.

Each path of the multi-path channel is treated as a virtual antenna in the time-reversal division multiple access system, which collectively results in very high-resolution spatial focusing with "pin-point" accuracy. The computer (or controller) may function as a base station or be coupled to a base station that performs most of the signal processing when transmitting signals to the devices and receiving signals sent from the devices.

Because the signals are transmitted through multiple propagation paths having various propagation lengths, a transmitter and a receiver need to obtain information about the overall system, e.g., information about the communication channel and information about time synchronization. In some implementations, such information is obtained in a channel probing (CP) phase and a data transmission (DT) phase of a time-reversal communication system. In the channel probing phase, the transmitter acquires channel information to realize the focusing effects, while in the data transmission phase, the receiver acquires timing information to synchronize and sample relevant signals. The process of obtaining channel information in the channel probing phase and obtaining synchronization in the data transmission phase is referred to as time-reversal handshaking The following describes several handshaking methods for obtaining necessary channel and timing information for enabling time-reversal communication systems.

Overview of Time-Reversal System

The following provides an overview of a time-reversal system. Referring to FIG. 1, a time-reversal system can be used in an environment having structures or objects that may cause one or more reflections of wireless signals. For example, a venue 102 may have a first room 104 and a second room 106. When a first device 108 in the first room 104 transmits a signal to a second device 110 in the second room 106, the signal can propagate in several directions and reach the second device 110 by traveling through several propagation paths, e.g., 112, 114, and 116. The signal traveling through multiple propagation paths is referred to as a multi-path signal. As the signal travel through the propagation paths, the signal may become distorted and noise may be added. The multipath signal received by the second device 110 can be quite different from the signal transmitted by the first device 108.

Figure 2A:
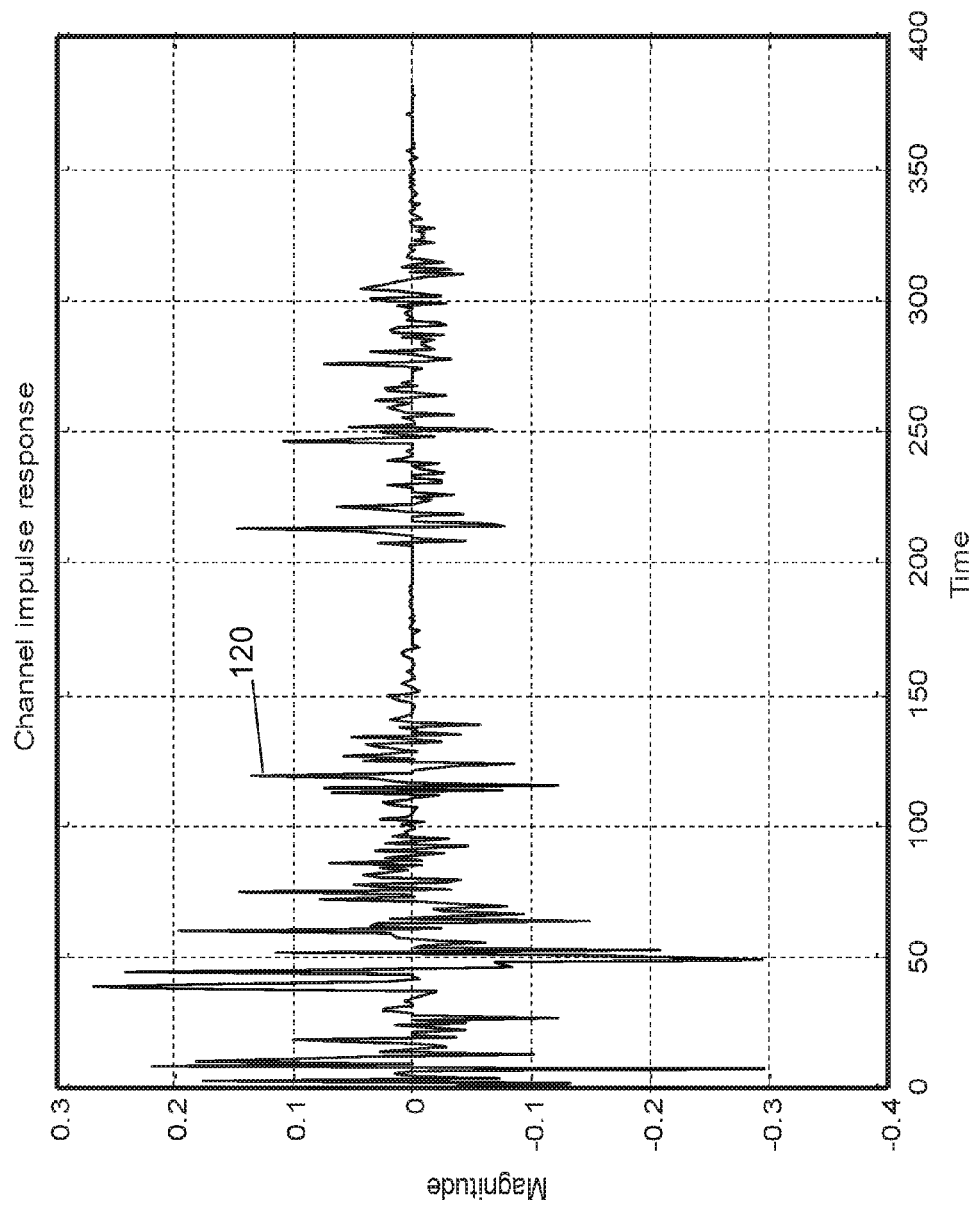
FIG. 2A is a graph of an exemplary recorded channel impulse response waveform.
Figure 2B:
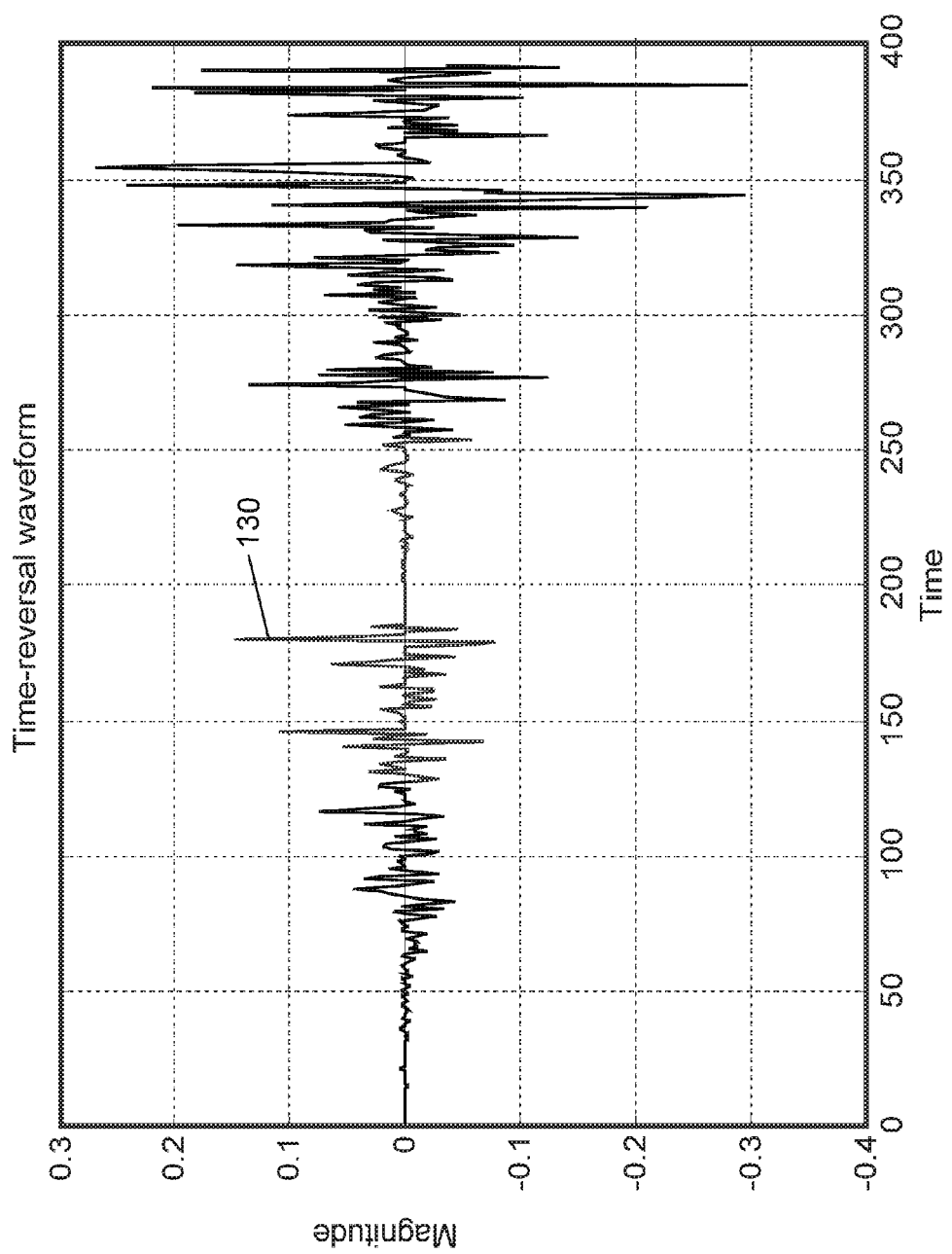
FIG. 2B is a graph of an exemplary time-reversed waveform generated by reversing the waveform of FIG. 2A with respect to time.

For example, referring to FIG. 2A, when the first device 108 sends a pulse signal, the signal received by the second device 110 may have a waveform 120. The waveform 120 is referred to as the channel impulse response signal. Referring to FIG. 2B, a time-reversed waveform 130 can be generated by reversing the waveform 120 with respect to time. If the second device 110 sends a signal having the waveform 130, the signal will propagation in various directions, including through propagation paths 112, 114, and 116 (in reverse direction relative to the propagation direction of the impulse signal), and reach the first device 108. The multipath signal received at the first device 108 forms an impulse signal that is similar to the impulse signal previously sent from the first device 108 to the second device 110.

The waveforms 120 and 130 shown in FIGS. 2A and 2B are merely examples. The waveforms in time-reversal systems can vary depending on, e.g., the environment and the information or data being transmitted.

When the second device 110 intends to transmit a data stream to the first device 108, the second device 110 uses normalized time-reversed conjugate signals as a basic waveform. The second device 110 loads the data stream on the basic waveform, and transmits the signal through the wireless channel. Usually the sampling rate is higher than the baud rate. The signal received at the receiver is the convolution of the transmitted signal and the channel impulse response, plus additive white Gaussian noise.

The first device 108 performs a simple adjustment to the received signal and down-samples it to recover the data stream transmitted by the second device 110.

In some examples a transmitter may send signals to two or more receivers at the same time. The transmitted signal travel through multiple propagation paths to each receiver. Because the receivers are positioned at different locations, the multipath signals travel through different propagation paths to reach the receivers, different multipath signals will be received at different receivers. By carefully constructing the waveform of the signal sent from the transmitter, it is possible to allow each receiver to receive data intended for the receiver with sufficiently high quality.

Figure 3:
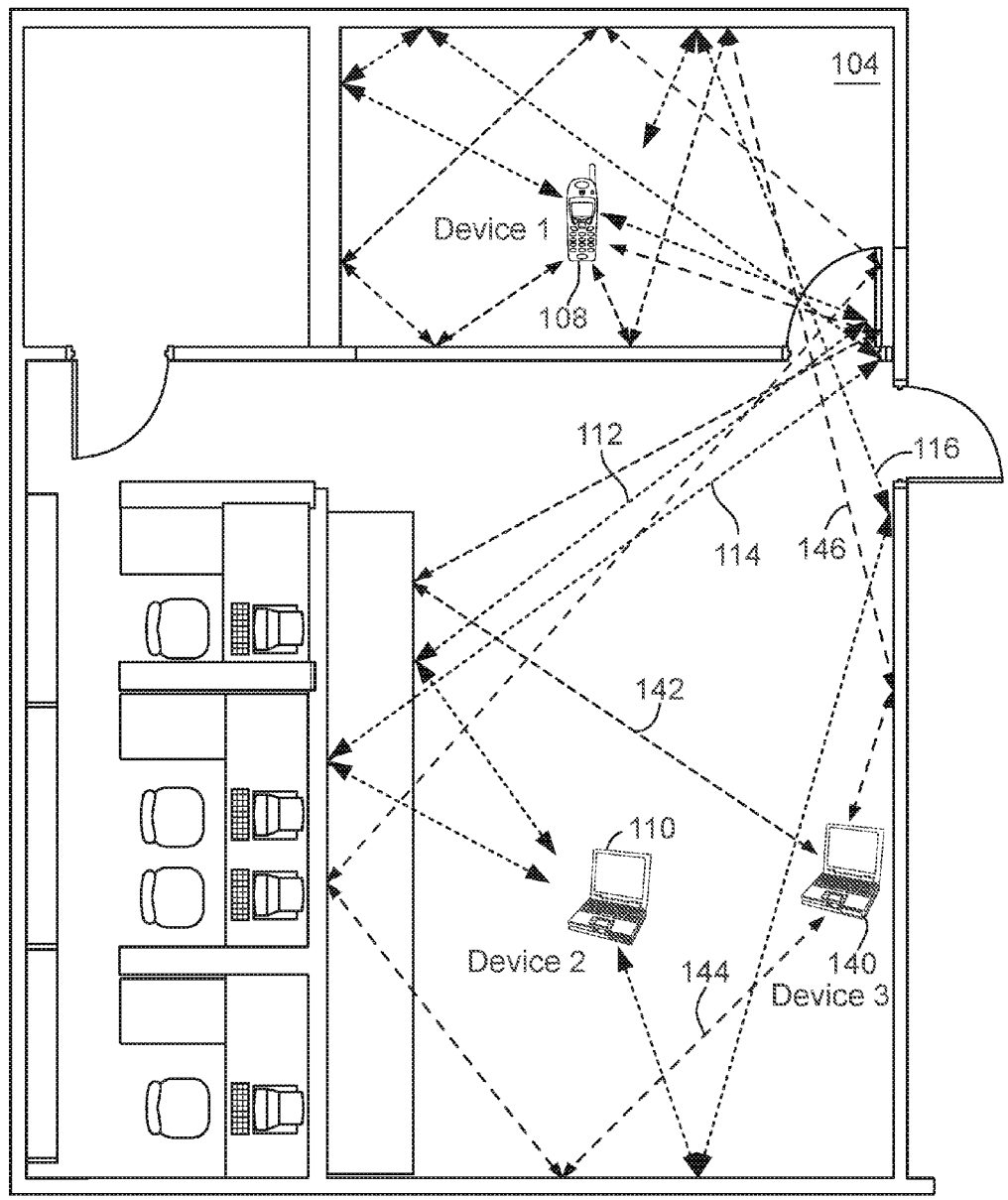
FIG. 3 is a diagram showing an exemplary environment for operating a time-reversal system having multiple receivers.

Referring to FIG. 3, the first device 108 may communicate with the second device 110 and a third device 140. During a hand-shaking process, the second device 110 sends a probe signal that travels through propagation paths 112, 114, and 116 to the first device 108. The probe signal can be, e.g., a pulse signal, a signal that has a predetermined waveform, or a signal that includes symbols. The first device 108 records the received waveform, and determines channel and timing information for the first multipath channel. The third device 110 sends a probe signal that travels through propagation paths 142, 144, and 146 to the first device 108. The first device 108 records the received waveform, and determines channel and timing information for the second multipath channel.

The first device 108 constructs a downlink signal that includes a first portion that is intended to be received by the second device 110 after the downlink signal propagates through the first multipath channel (including propagation paths 112, 114, and 116). The first portion is determined based on a first time-reversed multipath channel response, and is designed such that, after propagating through the first multipath channel, the signal received by the second device 110 includes first timing information and a first payload. The first timing information enables the second device 110 to accurately determine the beginning of the first payload, which includes data intended for the second device 110.

The downlink signal includes a second portion that is intended to be received by the third device 140 after the downlink signal propagates through the second multipath channel (including propagation paths 142, 144, and 146). The second portion is determined based on a second time-reversed multipath channel response, and is designed such that, after propagating through the second multipath channel, the signal received by the third device 140 includes second timing information and a second payload. The second timing information enables the third device 140 to accurately determine the beginning of the second payload, which includes data intended for the third device 140.

In the example of FIG. 3, the first device 108 may use either an omnidirectional antenna or a directional antenna for broadcasting the downlink signal, as long as the downlink signal reaches each of the second and third devices 110 and 140 through multiple propagation paths.

In some examples, a multiple input multiple output (MIMO) system may be used in which the device operating as a transmitter has multiple transmit antennas, and each of the devices operating as a receiver has multiple receive antennas.

System Architecture

A time-reversal division multiple access architecture has two parts, the downlink part and the uplink part. In a time-reversal division multiple access downlink system, a base station (BS) transmits multiple data streams to several users simultaneously, in which each user is associated with a unique multi-path profile in rich-scattering environments. The time-reversal division multiple access downlink scheme exploits the spatial degrees of freedom of the environment and focuses the useful signal power mostly at the intended locations. Time reversal mirrors (TRMs) at the base station first time-reverse the channel response of each user's channel as the user's signature waveform, and then embed these signatures into the corresponding data streams. The transmitted signal from the base station in the time-reversal division multiple access downlink is a mixed signal that includes the data intended to be sent to several users (including different data intended for different users). When the combined signal propagates to a certain user through the corresponding multipath channel, a large number of multi-paths having identical phases will automatically resonate at this user's location, resulting in the spatial focusing of the power of the useful signal component that carries this user's data.

Within the time-reversal division multiple access framework, more sophisticated signature waveforms than the basic time-reversal waveform can be derived based on the multipath channel responses to further improve the performance of the time-reversal division multiple access downlink system, when additional computational complexity is affordable at the base station. One desirable feature of the time-reversal division multiple access downlink scheme is that most of the complexity in communication can be shifted to the base station side, facilitating low complexity in communication components at the end-users.

A time-reversal division multiple access uplink scheme can be implemented in which the terminal devices have low complexity communication components. The time-reversal division multiple access uplink scheme shares a strong duality in the mathematical structure with the downlink without increasing the complexity of the end-users. A virtual spatial focusing effect can be observed in the user's signature domain at the base station. Similar to that of the downlink scheme, the virtual spatial focusing effect enables the base station to use the user's time-reversal signature waveform to extract the useful component from the combined received signals, allowing multiple users accessing the base station simultaneously. Additionally, unlike many other conventional communications paradigms that adopt symmetric architectures, the uplink scheme shares the same processing power and channel knowledge at the base station with the downlink, allowing the end-user's communication component to have a low complexity.

Figure 4:
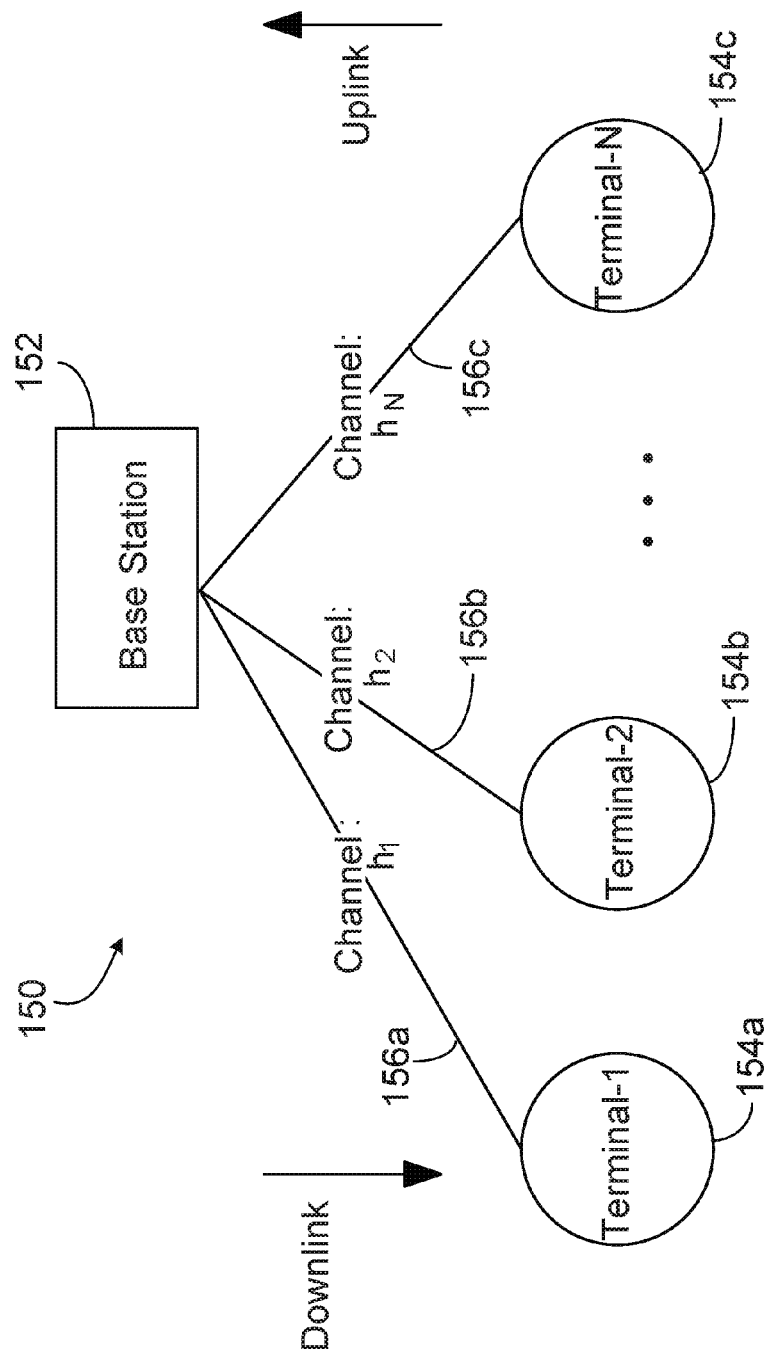
FIG. 4 is a diagram of an exemplary multi-user time reversal communication system.

Referring to FIG. 4, an exemplary multi-user time reversal communication system 150 includes a base station (BS) 152 and multiple terminal devices (e.g., 154a, 154b, 154c, collectively 154). Each of the terminal devices 154 is associated with a multi-path wireless channel (e.g., 156a, 156b, 156c, collectively 156) between itself and the base station 152. Each multi-path wireless channel 156 in the figure represents two or more multiple signal propagation paths between the corresponding terminal and the base station. In some implementations, all the devices (including the base station 152 and the terminals 154) can operate at the same frequency band, and the system operates in multi-path environments. For the downlink, the base station 152 can send multiple messages (either independent or non-independent) simultaneously to multiple selected terminals 154. For the uplink, multiple terminals 154 can send their own messages to the base station 152 simultaneously.

After each terminal device 154 registers with the base station 152, hand-shaking occurs periodically between the base station 152 and each of the registered terminal devices 154 so that the base station 152 can maintain up-to-date records of the channel responses associated with the terminal devices 154. The hand-shaking also enables the base station 152 and the terminal devices 154 to obtain accurate timing information.

In the system 150, the time-reversed waveform is able to boost the signal-to-noise ratio at the receiver with a low transmitter complexity. The receiver complexity is also low due to the one-tap detection, that is, the receiver detects the received signal using one sample instead of more complicated receiver equalization.

Figure 5:
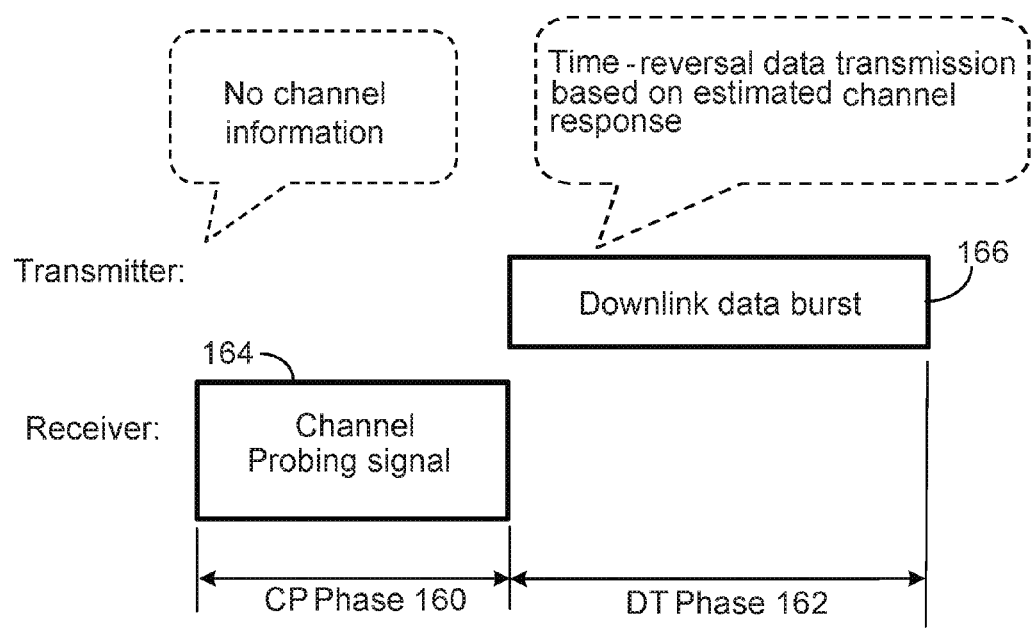
FIG. 5 is a diagram of various phases of time-reversal wireless communication.

Referring to FIG. 5, in general, in a time reversal communication system, communication between a first device and a second device occurs in two phases: the channel probing phase 160 and the data transmission phase 162. In the diagram of FIG. 5, the horizontal axis represents time. In the description below, when two devices are performing time reversal wireless communication, the device that sends payload data is referred to as the "transmitter" and the device that receives payload data is referred to as the "receiver," even though during the channel probing phase the "receiver" may send a channel probing signal to the "transmitter."

In the channel probing phase 160, the receiver first sends a channel probing signal 164 that propagates through a scattering and multi-path environment, and the signals are received by the transmitter. The transmitter estimates the channel response (CR). In the data transmission phase 162, the transmitter transmits the time-reversed channel response with useful information back through the same channel to the receiver. Due to channel reciprocity, the wave is focused at the receiver at a particular time instant. The receiver simply samples at the focusing time instant to obtain the useful information.

During the channel probing phase, the transmitter needs to obtain channel information that is sufficiently accurate in order to realize the focusing effects. In the data transmission phase, the receiver needs to obtain sufficiently accurate timing information in order to synchronize and sample the signal at the correct time. The process of obtaining channel information in the channel probing phase and getting synchronized in the data transmission phase is referred to as time reversal handshaking Techniques for time-reversal handshaking is described in U.S. patent application Ser. No. 14/183,648, titled "Handshaking Protocol For Time-Reversal System," filed on Feb. 19, 2014, the contents of which are incorporated by reference in their entirety.

The time reversal communication system 150 has many advantages. The system 150 leverages the multi-path channel as a matched filter, i.e., harvesting energy from the scattering environment, it is highly energy efficient. Moreover, because the receiver only needs to sample at the particular time instant without sophisticated processing to obtain the useful information, the receiver is easy to implement, i.e., the computational complexity at the receiver can be low. The advantages mentioned above depend on having adequate knowledge about the overall system at both the transmitter and the receiver, e.g., the channel information and time information. Such information needs to be obtained in the channel probing phase and the data transmission phase of the time reversal communication system.

Figure 6:
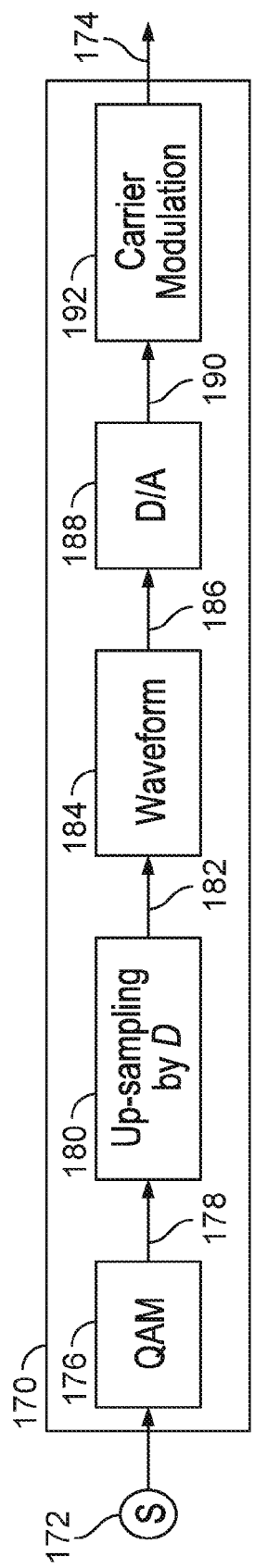
FIG. 6 is a block diagram of a transmitter in a quadrature amplitude modulation (QAM) time-reversal system.

Referring to FIG. 6, in some implementations, a transmitter 170 in the system 150 processes information bits 172 and generates a downlink signal 174 for transmission to a receiver. For example, the transmitter 170 can be part of the base station 152, and the receiver can be part of the terminal device 154. The processing of information bits for transmission in the time reversal system 150 includes two phases. In the first phase, the receiver first sends a probe signal, which is received by the transmitter as a channel response signal. The probe signal can include arbitrary channel training signals. The transmitter 170 generates a signature waveform based on the channel response signal. In the second phase, a quadrature amplitude modulation module 176 maps the information bits 172 into a stream of complex symbols 178. An up-sampling module 180 up-samples the complex symbols 178 to generate an up-sampled symbol stream 182. A convolution module 184 performs a convolution of the symbol stream 182 and the signature waveform (which can be a complex waveform calculated based on the channel response) to generate a signal 186. The signal 186 is passed through a digital-to-analog converter 188 that generates an analog signal 190. A carrier modulation module 192 modules the analog signal 190 with a carrier signal having a carrier frequency $f_c$ to generate the carrier modulated signal 174, which is transmitted through an antenna.

Figure 7:
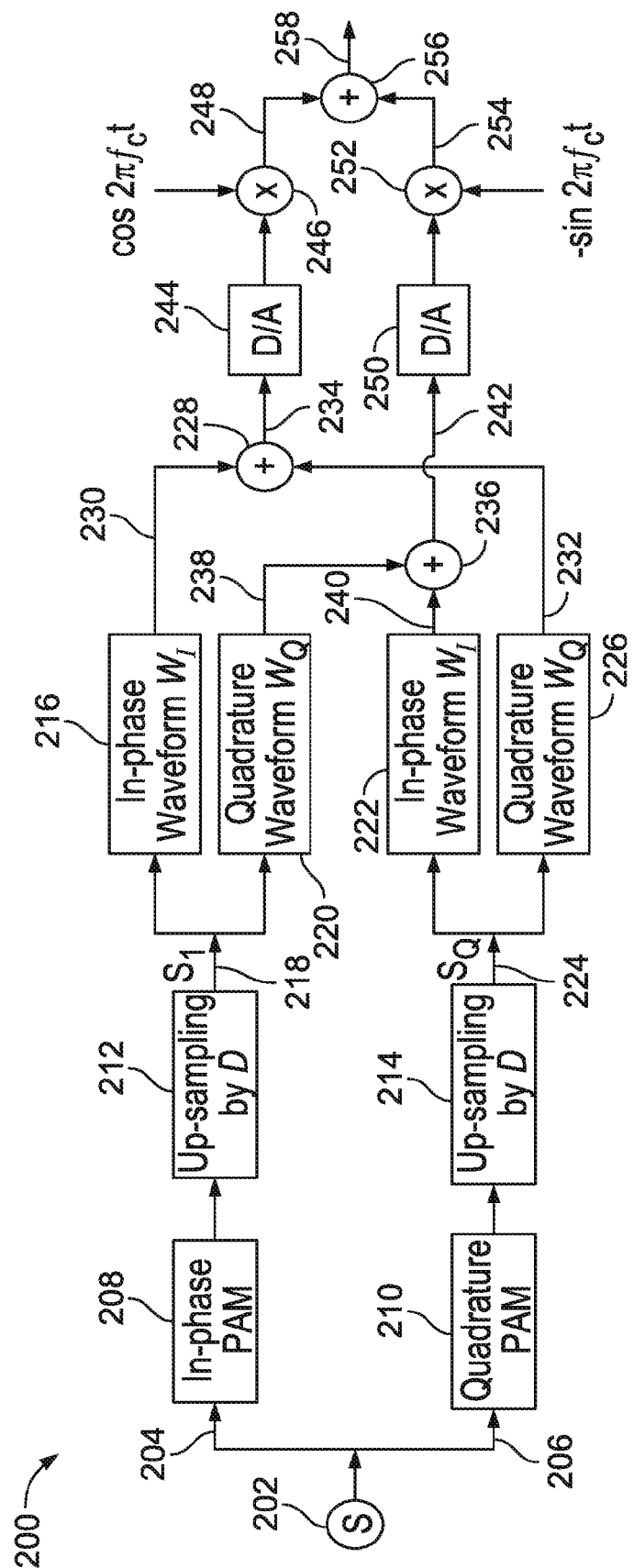
FIG. 7 is a diagram of an implementation of a transmitter in a quadrature amplitude modulation time-reversal system.

Each block in FIG. 6 can be implemented in various ways. For example, FIG. 7 is a diagram of a transmitter 200 having components that process the in-phase and quadrature components of the symbol stream and the in-phase and quadrature components of the signature waveform.

The transmitter 200 modulates information bits 202 into complex symbols denoted by X[m] using quadrature amplitude modulation, where m is the time index. The quadrature amplitude modulation can be performed parallelly in two streams, i.e., in-phase and quadrature. The information bits are split into two parts 204, 206 as the inputs of the two streams. For example, bits at even positions can be provided to one stream and bits at odd positions can be provided to the other stream.

Each stream performs pulse-amplitude modulation (PAM) to the incoming information bits. An in-phase PAM module 208 performs in-phase PAM for the first stream of information bits 204. A quadrature PAM module 210 performs quadrature PAM for the second stream of information bits 206. For M-QAM, the real and imaginary parts are modulated by $\sqrt{M}$-PAM, i.e., $$Re\{X[m]\}, Im\{X[m]\} \in \{\pm A, \pm 3A, \ldots, \pm(\sqrt{M}-1)A\},$$

where A is a constant used to normalize the average symbol power, i.e., $$\frac{1}{\sqrt{M}} \sum_{k=1}^{\frac{\sqrt{M}}{2}} 2(2k-1)^2 A^2 = 1$$

For example, for 4 QAM (QPSK), $$A = \frac{1}{2}. \text{ For } 16QAM, A = \frac{1}{\sqrt{10}}.$$

Figure 9:
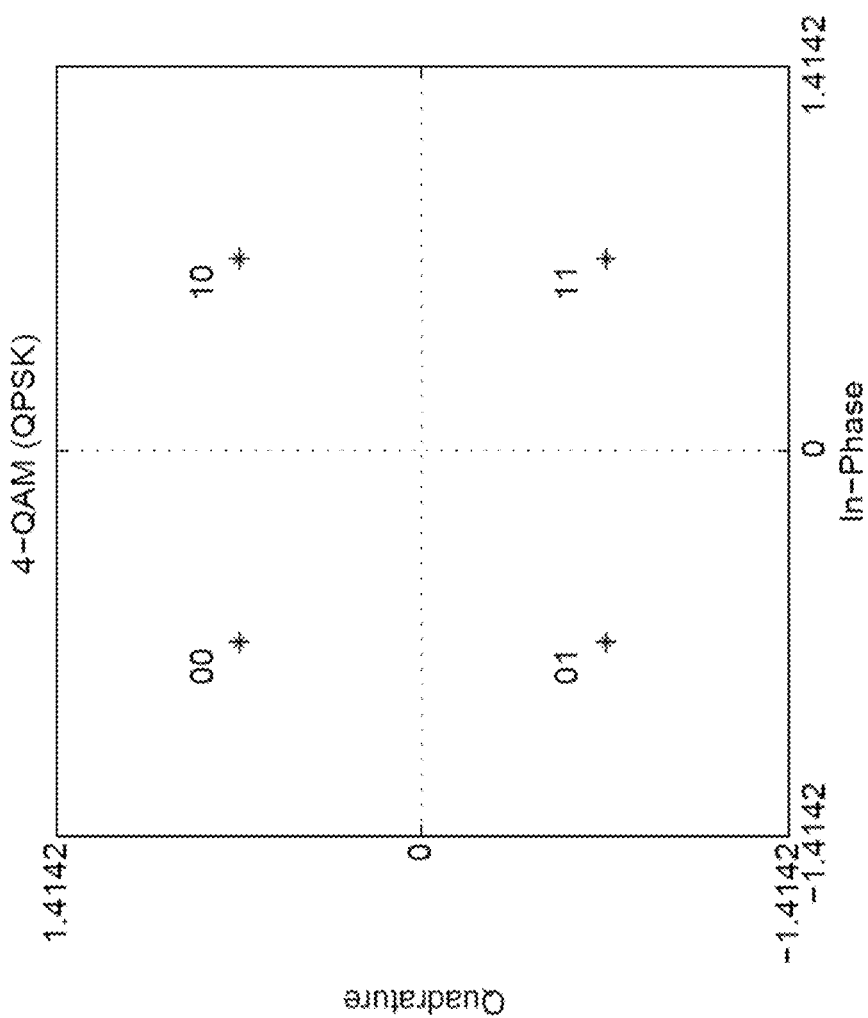
FIG. 9 is a diagram of bit/symbol mapping for 4 QAM or QPSK (quadrature phase shift keying).
Figure 10:
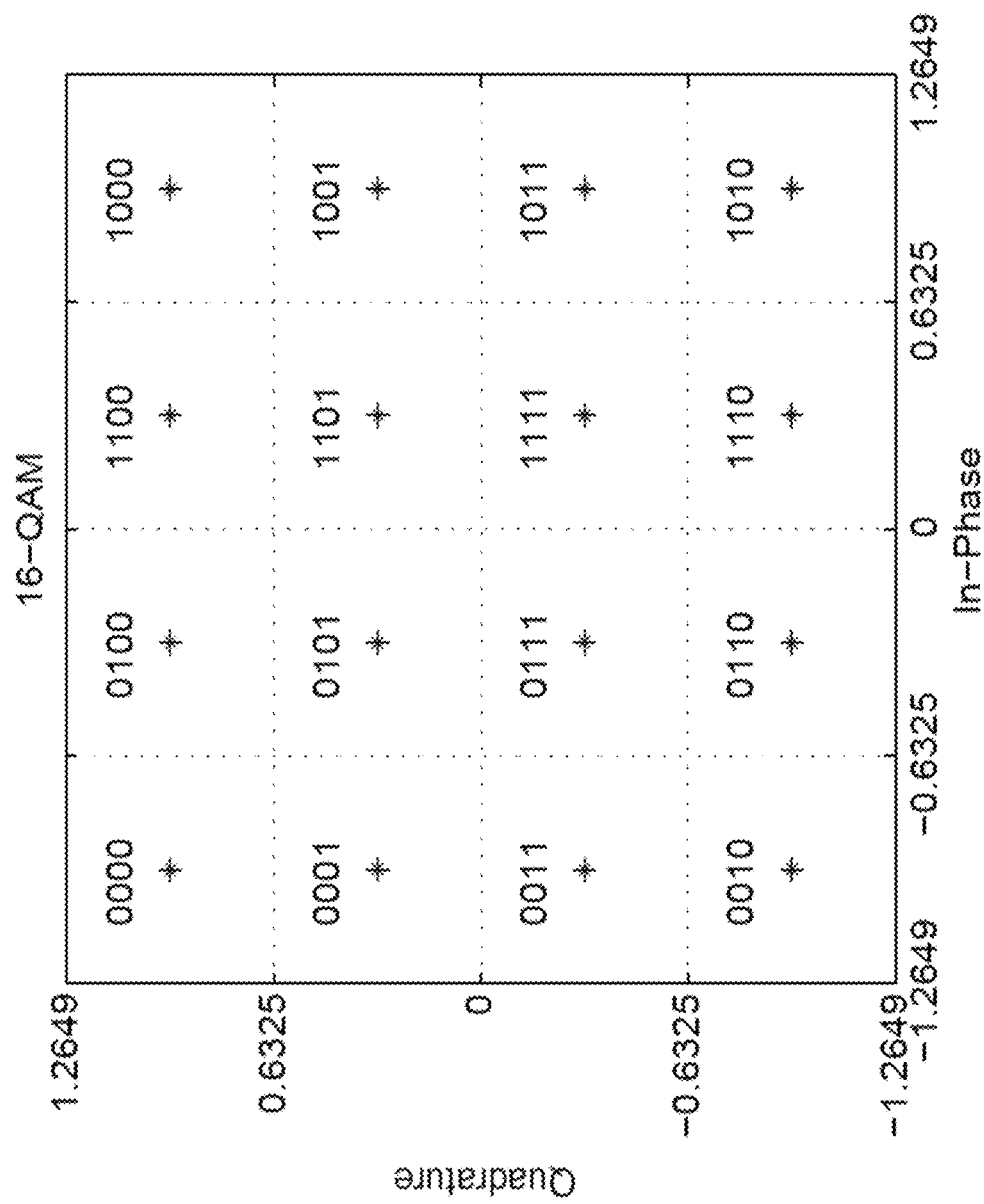
FIG. 10 is a diagram of bit/symbol mapping for 16 QAM.

Gray code can be used in the modulation mapping to minimize the bit error rate (BER). For example, for 4 PAM, the bit mapping to symbols {−3A, −A, A, 3A} is {00,01,11,10}. For 8 PAM, the bit mapping to symbols {−7A, −5A, −3A, −A, A, 3A, 5A, 7A} is {000,001,011,010,110,111,101,100}. FIGS. 9 and 10 show the Gray-coded bit/symbol mapping for 4 QAM (QPSK) and 16 QAM.

At an up-sampling module 212, the first modulated symbol sequence is up-sampled by a back-off rate D to reduce the intersymbol interference but sacrificing the information rate, i.e., decreasing the average number of information bits transmitted per time slot. Similarly, at an up-sampling module 214, the second modulated symbol sequence is up-sampled by a back-off rate D. The up-sampling can be expressed as follows. The input symbols X[m] are fed into the up-sampler modules 212 or 214, and the output symbols S[m] can be expressed as $$S[m] = \begin{cases} X\left[\frac{m}{D}\right], & \text{if } m = kD, k = 0, 1, 2, \ldots \\ 0, & \text{otherwise} \end{cases}.$$

The complex symbols $S[m]=S_I[m]+jS_Q[m]$ are then convolved with the complex signature waveform $W[m]=W_I[m]+jW_Q[m]$ as shown in FIG. 7. An in-phase signature waveform convolution module 216 calculates the convolution of the in-phase up-sampled symbols $S_I$ 218 and the in-phase portion of the signature waveform $W_I$. A quadrature signature waveform convolution module 220 calculates the convolution of the in-phase up-sampled symbols $S_I$ 218 and the quadrature portion of the signature waveform $W_Q$. An in-phase signature waveform convolution module 222 calculates the convolution of the quadrature up-sampled symbols $S_Q$ 224 and the in-phase portion of the signature waveform $W_I$. A quadrature signature waveform convolution module 226 calculates the convolution of the quadrature up-sampled symbols $S_I$ 224 and the quadrature portion of the signature waveform $W_Q$. The convolution can be expressed as $$S[m]*W[m]=(S_I[m]*W_I[m]-S_Q[m]*W_Q[m])+ j(S_I[m]*W_Q[m]+S_Q[m]*W_I[m]).$$

An adder 228 adds an output 230 of the in-phase signature waveform convolution module 216 and an output 232 of the quadrature signature waveform convolution module 226 to generate the in-phase portion 234 of the convolution S[m]*W[m]. An adder 236 adds an output 238 of the quadrature signature waveform convolution module 220 and an output 240 of the in-phase signature waveform convolution module 222 to generate the in-phase portion 242 of the convolution S[m]*W[m].

The in-phase portion 234 of the convolution is passed through a digital-to-analog converter (D/A) 244 and is modulated by an in-phase carrier signal cos $2\pi f_c t$ at a mixer 246 to generate an in-phase portion 248 of a downlink transmission signal 258. Similarly, the quadrature portion 242 of the convolution is passed through a digital-to-analog converter 250 and is modulated by a quadrature carrier signal sin $2\pi f_c t$ at a mixer 252 to generate a quadrature portion 254 of the downlink transmission signal 258. An adder 256 adds the in-phase portion 248 and quadrature portion 254 to generate the downlink transmission signal 258.

Figure 8:
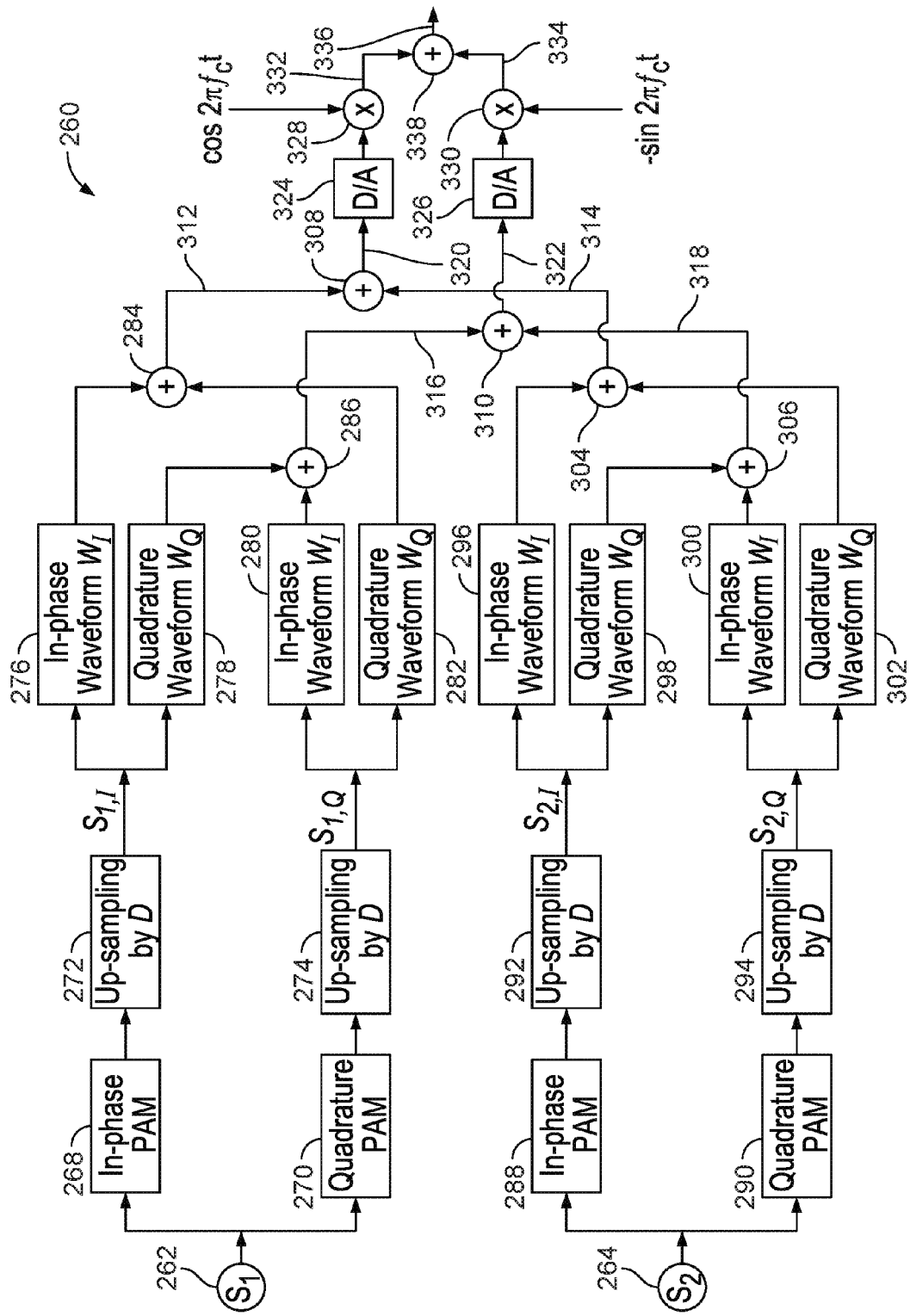
FIG. 8 is a block diagram of a transmitter that generates downlink signals for multiple devices.

Referring to FIG. 8, in some implementations, a 260 modulates a first stream of information bits 262 and a second stream of information bits 264, and processes the two streams of modulated symbols to generate a combined downlink signal 266. The first stream of information bits 262 can be intended for a first terminal device, and the second stream of information bits 264 can be intended for a second terminal device. The information bits 262 are modulated into complex symbols using quadrature amplitude modulation at an in-phase PAM module 268 and a quadrature PAM module 270. The in-phase and quadrature PAM modulated symbols are up-sampled at the up-sampling modules 272 and 274, respectively. The in-phase up-sampled symbols are convolved with the signature waveform at the in-phase signature waveform convolution module 276 and quadrature signature waveform convolution module 278. The quadrature up-sampled symbols are convolved with the signature waveform at the in-phase signature waveform convolution module 280 and quadrature signature waveform convolution module 282. An adder 284 adds the output of the in-phase signature waveform convolution module 276 and the output of the quadrature signature waveform convolution module 282 to generate the in-phase portion 312 of the convolution $S_1[m]*W[m]$ for the first stream of symbols. An adder 286 adds the output of the quadrature signature waveform convolution module 278 and the output of the in-phase signature waveform convolution module 280 to generate the quadrature portion 316 of the convolution $S_1[m]*W[m]$ for the first stream of symbols.

The second stream of information bits 264 are modulated into complex symbols using quadrature amplitude modulation at an in-phase PAM module 288 and a quadrature PAM module 290. The in-phase and quadrature PAM modulated symbols are up-sampled at the up-sampling modules 292 and 294, respectively. The in-phase up-sampled symbols are convolved with the signature waveform at the in-phase signature waveform convolution module 296 and quadrature signature waveform convolution module 298. The quadrature up-sampled symbols are convolved with the signature waveform at the in-phase signature waveform convolution module 300 and quadrature signature waveform convolution module 302. An adder 304 adds the output of the in-phase signature waveform convolution module 296 and the output of the quadrature signature waveform convolution module 302 to generate the in-phase portion 314 of the convolution $S_2[m]*W[m]$ for the second stream of symbols. An adder 306 adds the output of the quadrature signature waveform convolution module 298 and the output of the in-phase signature waveform convolution module 300 to generate the quadrature portion 318 of the convolution $S_2[m]*W[m]$ for the second stream of symbols.

An adder 308 adds the in-phase portion 312 of the convolution $S_1[m]*W[m]$ for the first stream of symbols and the in-phase portion 314 of the convolution $S_2[m]*W[m]$ for the second stream of symbols to generate a combined in-phase signal 320. The combined in-phase signal 320 is passed through a digital-to-analog converter 244 and modulated by an in-phase carrier signal cos $2\pi f_c t$ at a mixer 328 to generate an in-phase portion 332 of a combined downlink transmission signal 336. An adder 310 adds the quadrature portion 316 of the convolution $S_1[m]*W[m]$ for the first stream of symbols and the quadrature portion 318 of the convolution $S_2[m]*W[m]$ for the second stream of symbols to generate a combined quadrature signal 322. The combined quadrature signal 322 is passed through a digital-to-analog converter 326 and modulated by a quadrature carrier signal sin $2\pi f_c t$ at a mixer 330 to generate a quadrature portion 334 of the downlink transmission signal 336. An adder 338 adds the in-phase portion 332 and quadrature portion 334 to generate the combined downlink transmission signal 336.

The example of FIG. 8 shows a transmitter that combines two streams of information bits intended for two terminal devices. The same principle can be applied to processing additional streams of information bits intended for additional terminal devices. An adder adds the in-phase portion of the convolution $S_i[m]*W[m]$ for each of the streams of symbols to generate a combined in-phase signal that is passed through a digital-to-analog converter and modulated by an in-phase carrier signal cos $2\pi f_c t$ to generate an in-phase portion of a combined downlink transmission signal. An adder adds the quadrature portion of the convolution $S_i[m]*W[m]$ for each of the streams of symbols to generate a combined quadrature signal that is passed through a digital-to-analog converter and modulated by a quadrature carrier signal sin $2\pi f_c t$ to generate a quadrature portion of the downlink transmission signal. An adder adds the in-phase portion and the quadrature portion to generate the combined downlink transmission signal.

A feature of the time-reversal system 150 is that after the information bits are pulse amplitude modulated and convolved with the signature waveforms, the signals corresponding to different streams of information bits can be carrier modulated using the same carrier frequency, added together, and transmitted through an antenna at the same time.

Other approaches such as the polar form method can be applied to implement the transmitter 200 of FIG. 7 or 260 of FIG. 8. The polar form method is to implement the multiplication of two complex values by first multiplying the amplitudes of the two complex values, adding the phases of the two complex values, and then combining the multiplied amplitude and phase into one complex value. In polar form multiplication, if two complex values are to be multiplied, say $p=|p|e^{j*arg(p)}$ and $q=|q|e^{j*arg(q)}$ where arg(·) denotes the phase, then the multiplication can be obtained by $p \cdot q = (|p|\cdot|q|)e^{j(arg(p)+arg(q))}$.

Figure 11:
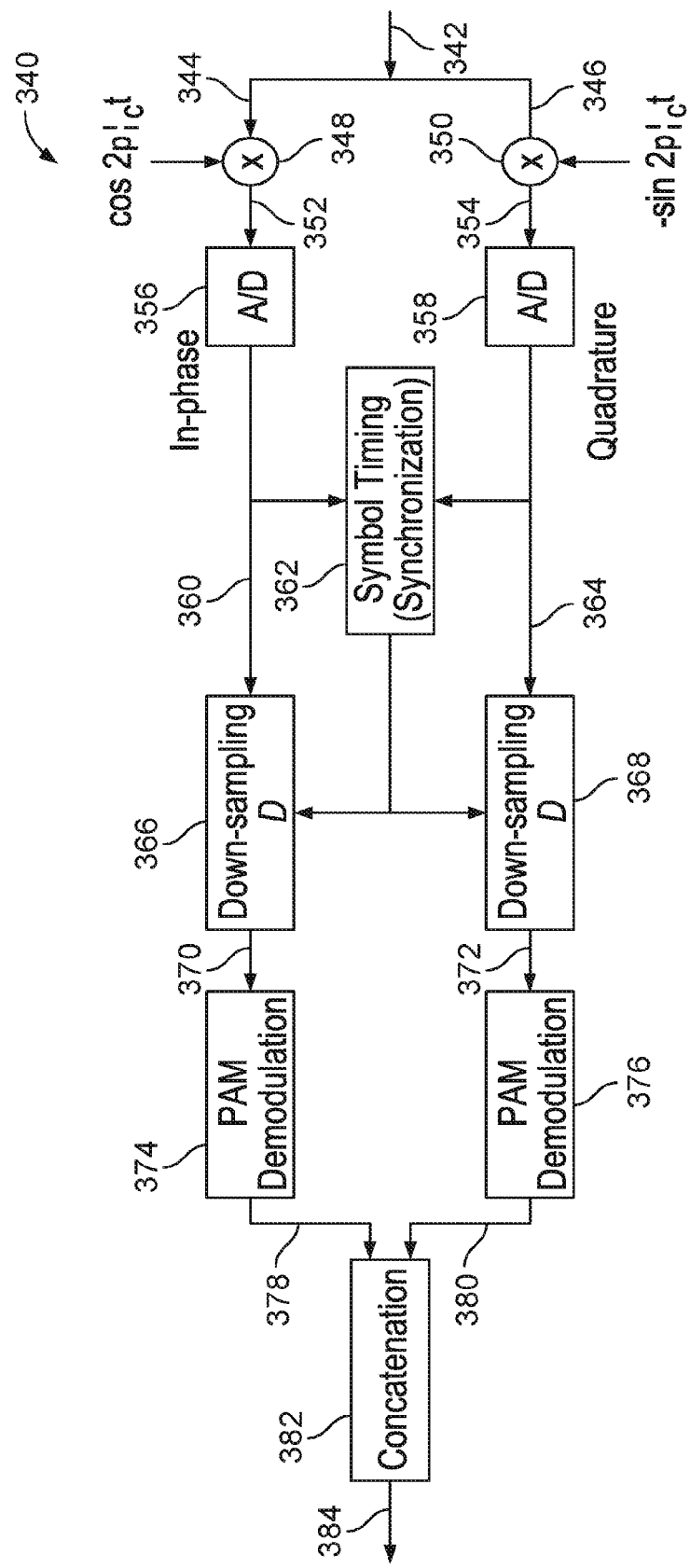
FIG. 11 is a diagram of a receiver in a quadrature amplitude modulation time-reversal system.

FIG. 11 is a block diagram of an example receiver 340 in the quadrature amplitude modulation time-reversal system 150. For example, the receiver 340 can be implemented in the terminal device 154 for receiving downlink signals transmitted by the base station 152. A received waveform 342 (e.g., transmitted by one of the terminal devices) is divided into a first stream 344 and a second stream 346. The first stream 344 is demodulated at a mixer 348 by an in-phase carrier signal cos $2\pi f_c t$ to generate a demodulated signal 352 that is passed through an analog-to-digital converter 356. The second stream 346 is demodulated at a mixer 350 by a quadrature carrier signal sin $2\pi f_c t$ to generate a demodulated signal 354 that is passed through an analog-to-digital converter 358. An output 360 of the analog-to-digital converter 356 is down-sampled at a down-sampling module 366 to generate a down-sampled in-phase stream 370. An output 364 of the analogto-digital converter 358 is down-sampled at a down-sampling module 368 to generate a down-sampled quadrature stream 372.

A symbol timing synchronization module 362 generates a timing synchronization signal provided to the down-sampling modules 366 and 368 so that the down-sampling modules 366 and 268 sample the signals with correct timing. The down-sampled in-phase stream 370 is demodulated using PAM demodulation, which is a symbol/bit mapping, to generate a demodulated in-phase stream 378. The down-sampled quadrature stream 372 is demodulated using PAM demodulation to generate a demodulated quadrature stream 380. The demodulated in-phase stream 378 and demodulated quadrature stream 380 are concatenated at a concatenation module 382 to generate the estimated bits 384 of the original transmitted bits. If the receiver 340 demodulates a downlink signal transmitted by the transmitter 200 of FIG. 7, the estimated bits 384 in FIG. 11 correspond to the information bits 202 of FIG. 7. If there are no errors during transmission, the estimated bits 384 will be the same as the information bits 202.

Error! Reference source not found. below lists the achievable bit rates using various orders of quadrature amplitude modulations and various rate back-off factors. A higher order modulation and lower rate back-off factor can provide a higher bit rate.

TABLE 1

Bit rates with different rate back-off factors and QAMs

|  | BPSK | QPSK | 16QAM | 64QAM | 256QAM |
| --- | --- | --- | --- | --- | --- |
| D = 1 | 1 Gbps | 2 Gbps | 4 Gbps | 6 Gbps | 8 Gbps |
| D = 2 | 500 Mbps | 1 Gbps | 2 Gbps | 3 Gbps | 4 Gbps |
| D = 4 | 250 Mbps | 500 Mbps | 1 Gbps | 1.5 Gbps | 2 Gbps |
| D = 8 | 125 Mbps | 250 Mbps | 500 Mbps | 750 Mbps | 1 Gbps |

Figure 12:
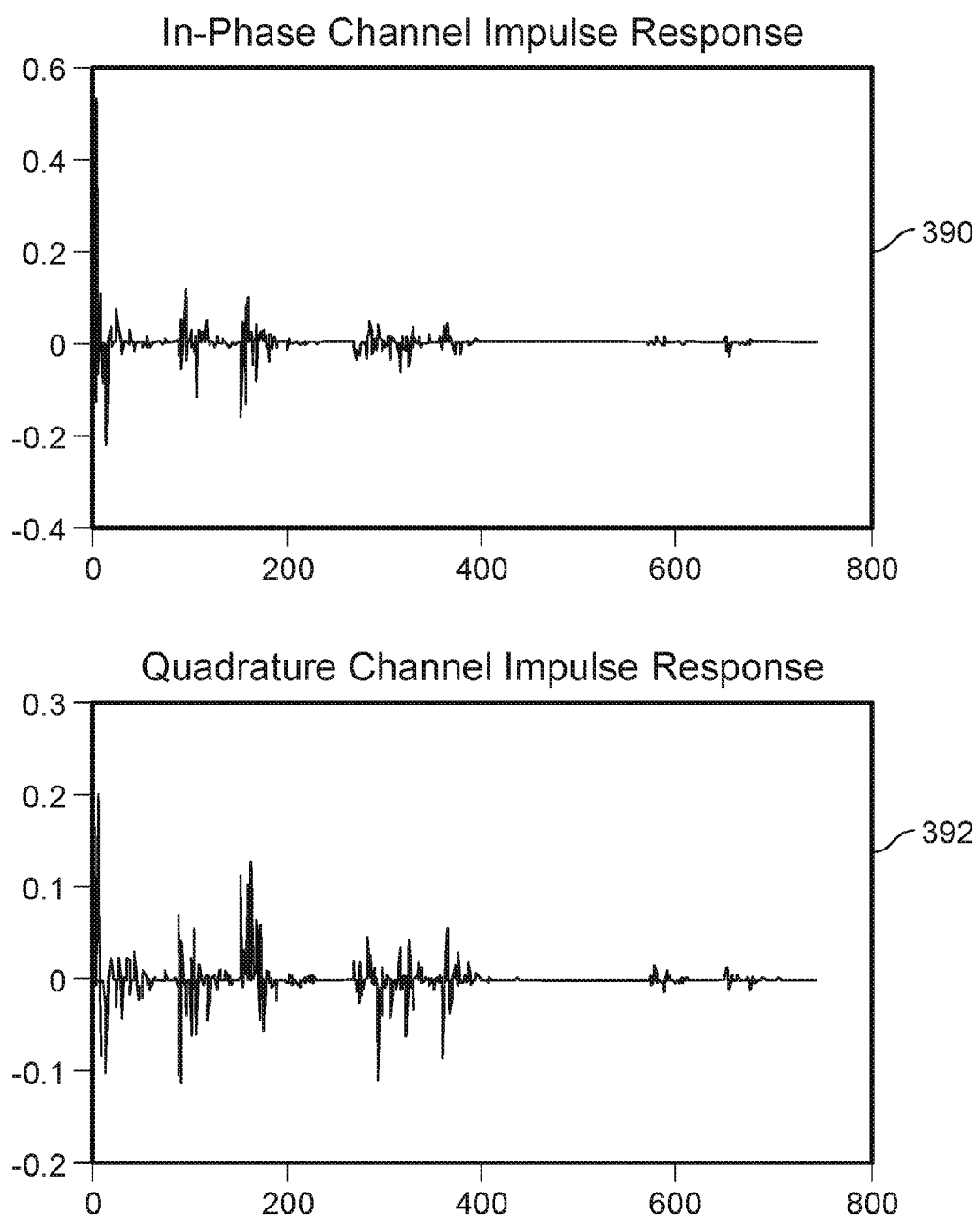
FIG. 12 show graphs of channel impulse response signals.

The following describes simulation results for quadrature amplitude modulation in a wireless time-reversal system. Referring to FIG. 12, graphs 390 and 392 show example in-phase and quadrature portions of a channel impulse response.

Figure 13:
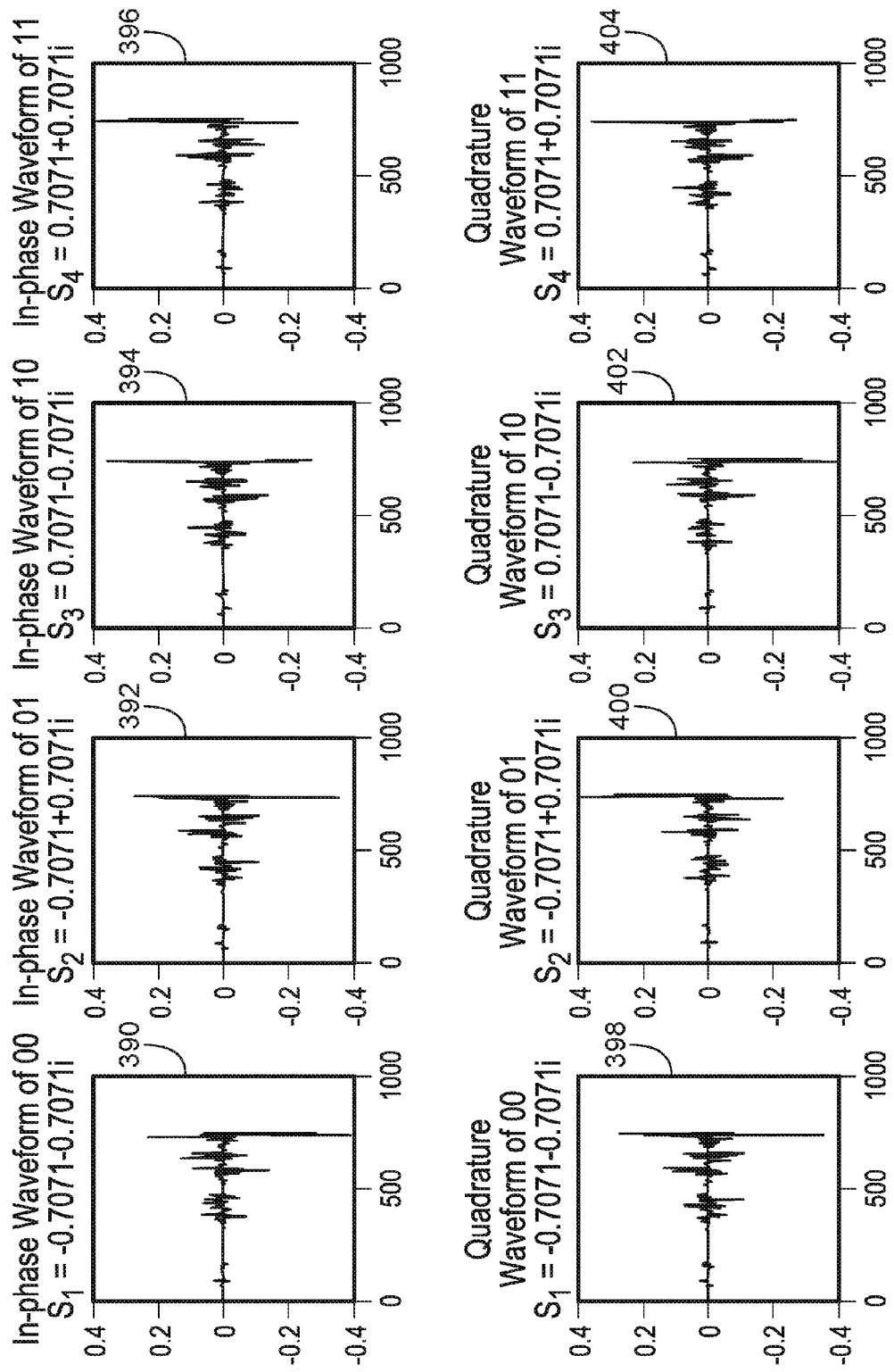
FIG. 13 show graphs of modulated waveforms using QPSK (4 QAM).

Referring to FIG. 13, graphs 390, 392, 394, and 396 show in-phase QPSK modulated waveforms for the symbols 00, 01, 10, and 11, respectively (before the digital-to-analog converter, e.g., 244 of FIG. 7). Graphs 398, 400, 402, and 404 show quadrature QPSK modulated waveforms for the symbols 00, 01, 10, and 11, respectively (before the digital-to-analog converter, e.g., converter 250 of FIG. 7).

Figure 14:
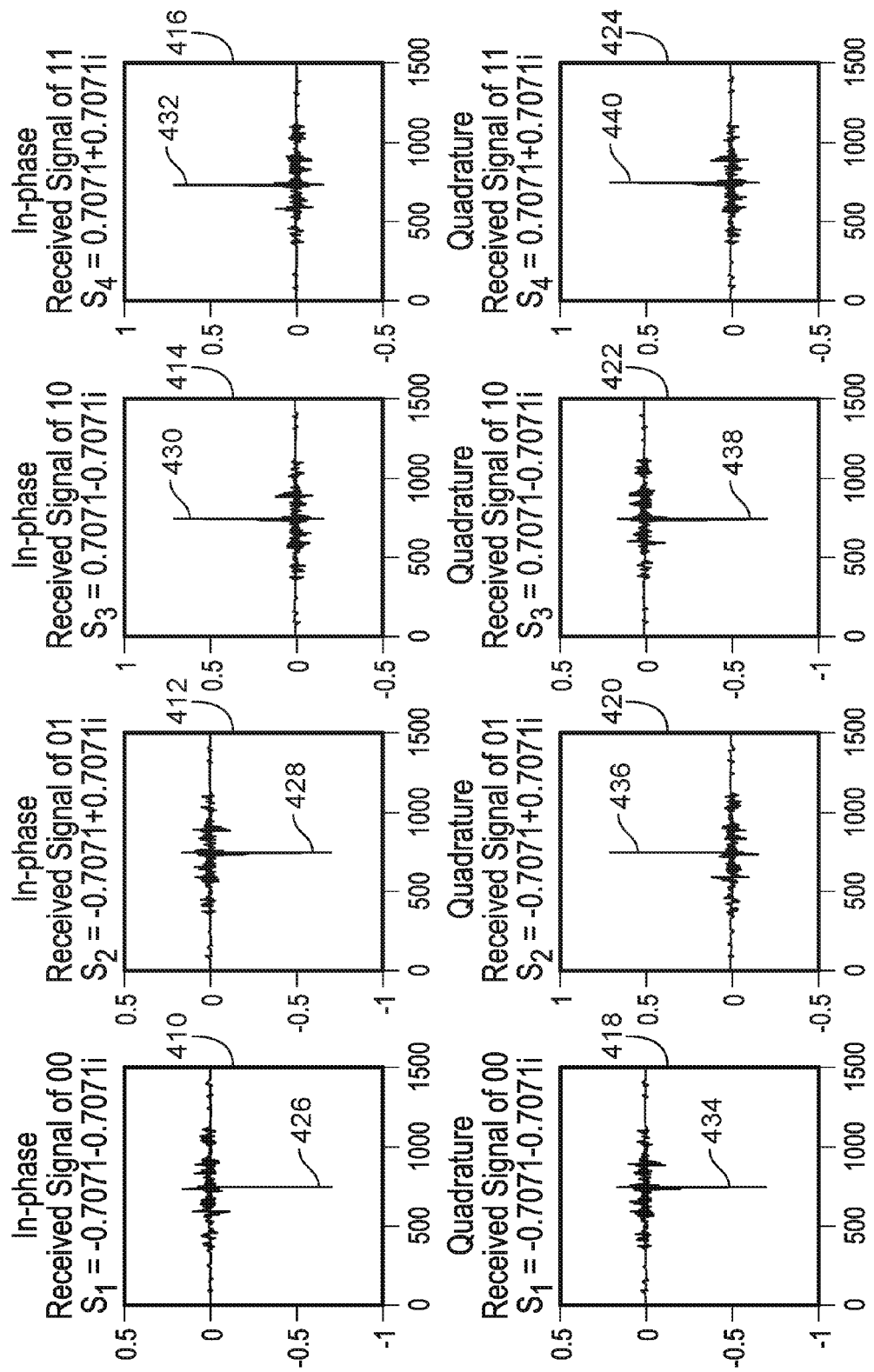
FIG. 14 is a graph showing a comparison of received signals of various quadrature amplitude modulation symbols transmitted when using (QPSK) 4 QAM.

Referring to FIG. 14, graphs 410, 412, 414, and 416 show the in-phase portions of the received signals for each of the transmitted symbols 00, 01, 10, and 11, respectively (after the analog-to-digital converter, e.g., 356 of FIG. 11). Graphs 418, 420, 422, and 424 show the quadrature portions of the received signals for each of the transmitted symbols 00, 01, 10, and 11, respectively (after the analog-to-digital converter, e.g., 358 of FIG. 11). The receiver determines the received signal based on a particular sample, e.g., a peak (e.g., 426) in the received signal by applying PAM demodulation on the particular sample to generate demodulated symbols. The polarity of the peaks (e.g., 426, 428, 430, 432) of the in-phase and quadrature received signals correspond to the real and imaginary parts of the original transmitted symbol.

Figure 15:
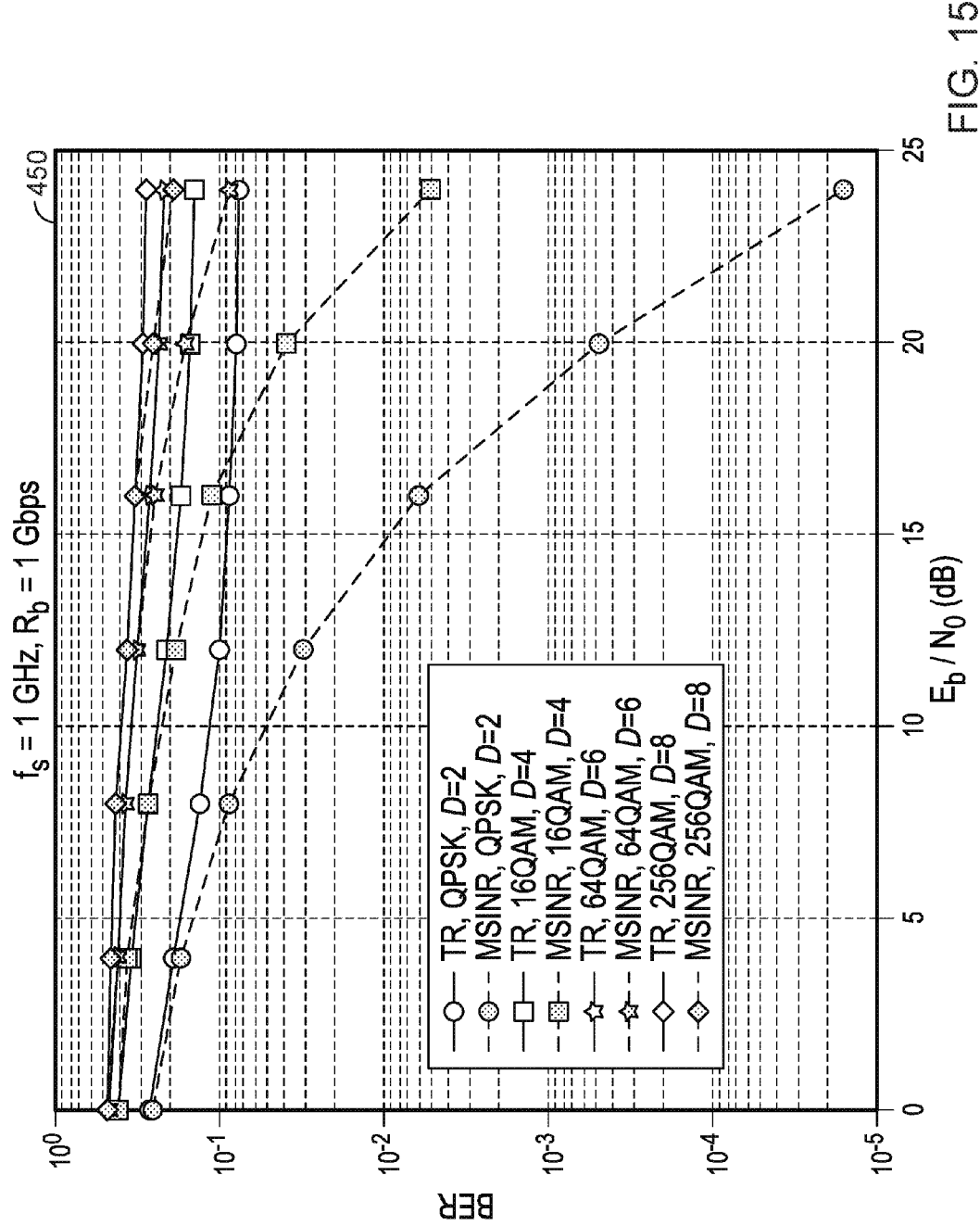
FIG. 15 is a graph showing a comparison of the bit error rate performance for a fixed bit rate.

Referring to FIG. 15, a graph 450 shows exemplary numerical simulation results for bit error rate (BER) performance of a time-reversal system at 1 Giga bit per second (Gbps). The sampling frequency is 1 Giga Hz (GHz). The legend "TR" represents the time-reversal system that uses the basic time reversal waveform. The legend "MSINR" represents the time-reversal system that modifies the waveforms to maximize signal-to-interference-and-noise-ratio. For the same bit rate, using a smaller rate back-off factor D achieves a better performance. A smaller rate back-off factor D allows the constellation size to be smaller, i.e., the minimum distance between symbols can be larger. However, a smaller rate back-off factor D may result in larger inter-symbol interference that degrades the signal-to-interference-and-noise ratio. The benefit of increased minimum distance overrides the signal-to-interference-and-noise ratio degradation and thus provides a better bit error rate performance.

Figure 16:
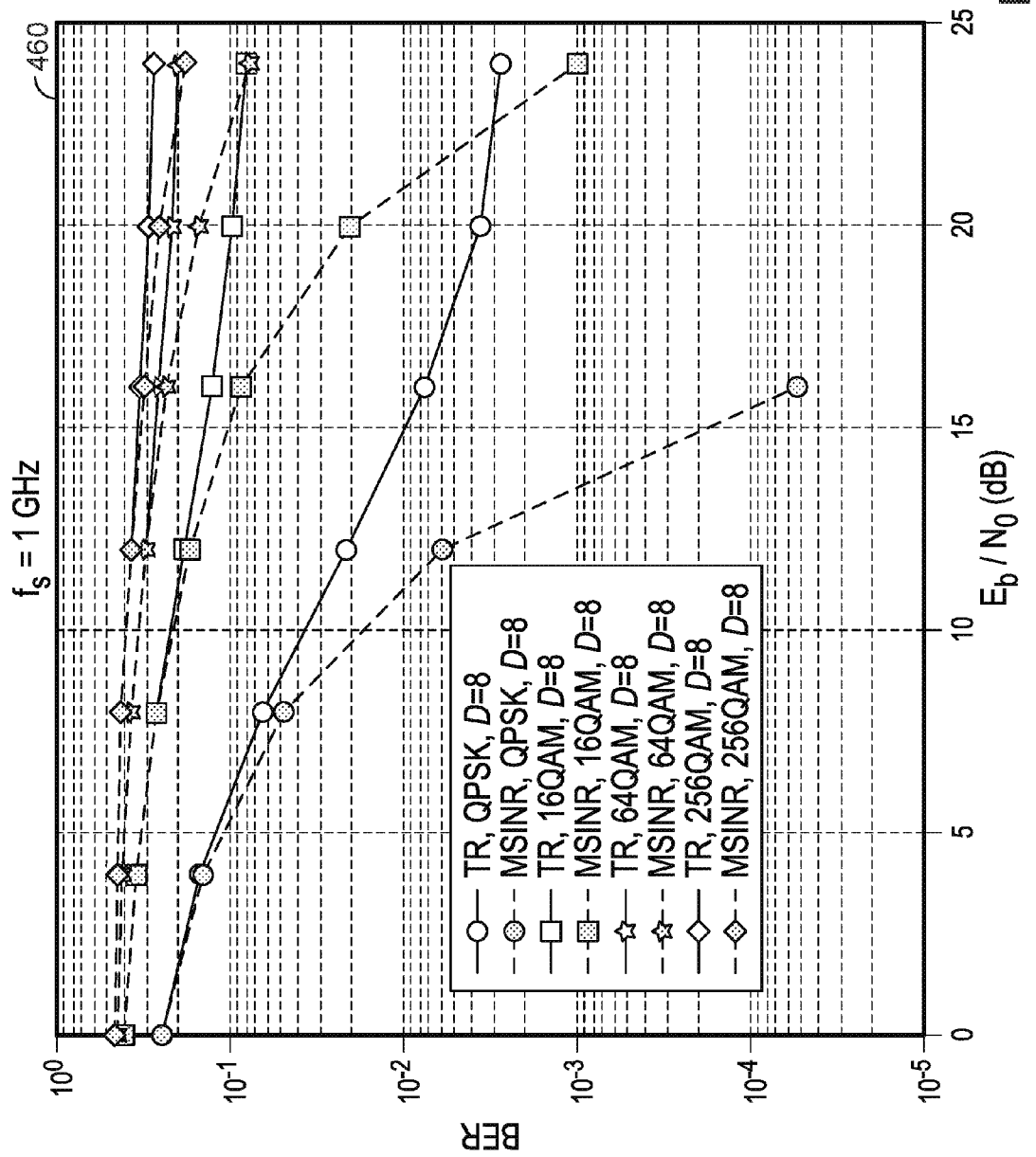
FIG. 16 is a graph showing a comparison of the bit error rate performance for a fixed rate back-off factor.

Referring to FIG. 16, a graph 460 shows a comparison of the bit error rate performance when the rate back-off factor D is fixed as 8 and the constellation sizes are varied.

Figure 17:
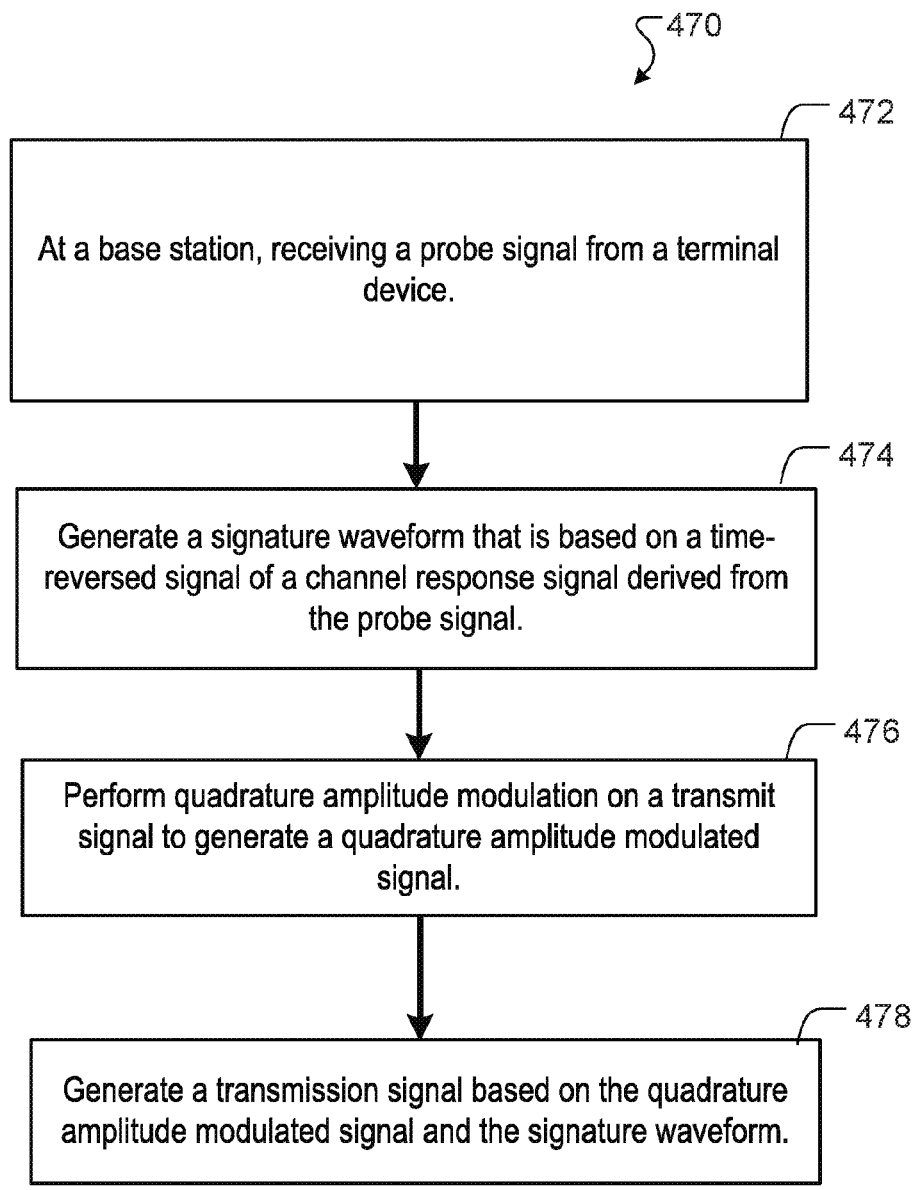
FIGS. 17 and 18 are flow diagrams of processes for time-reversal wireless communication.
Figure 18:
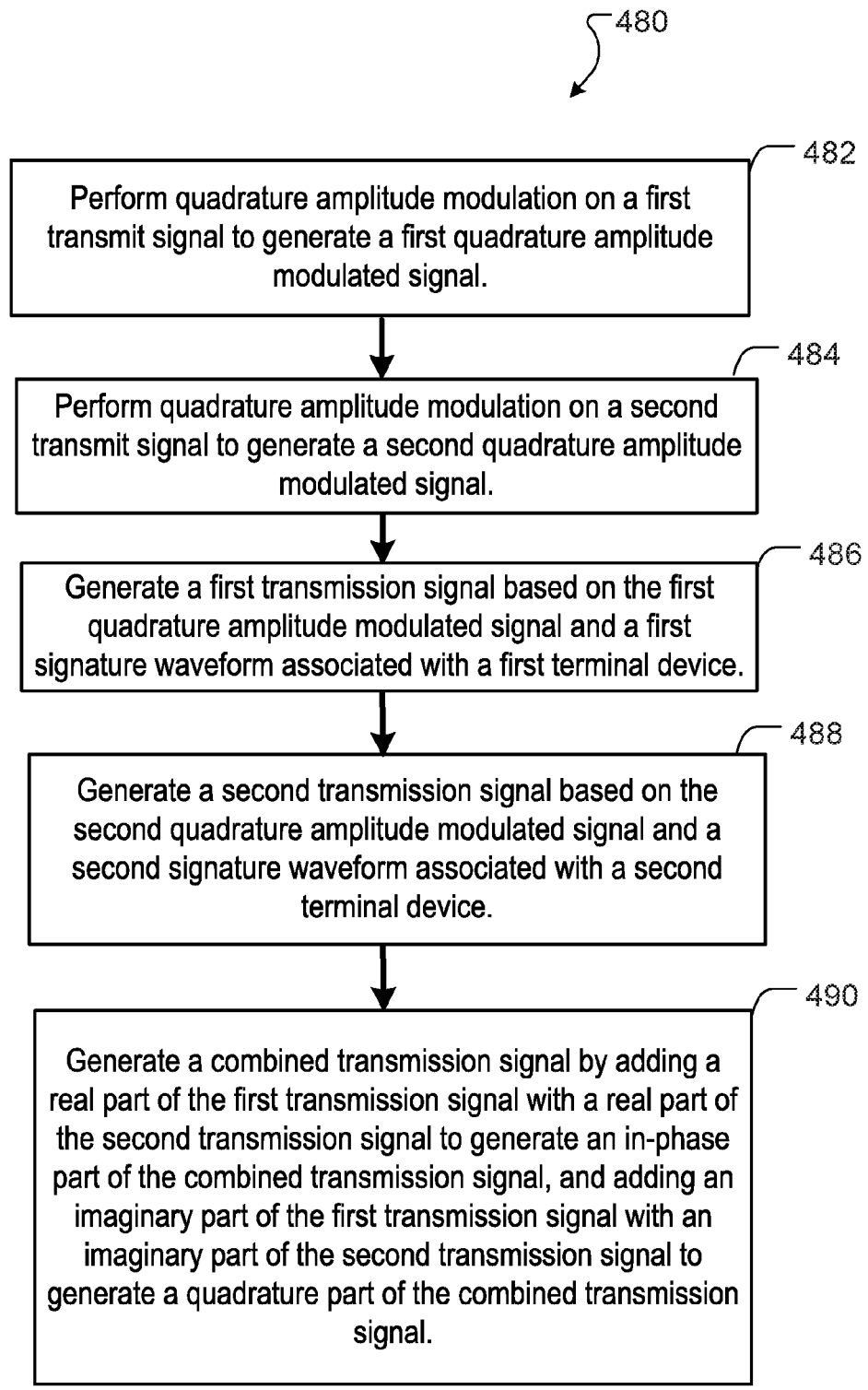

FIG. 17 is a flow diagram of a process 470 for time-reversal wireless communication using quadrature amplitude modulation. For example, the process 470 can be implemented by the transmitter 200 (FIG. 7) or 260 (FIG. 8). The process 470 includes at a base station, receiving a probe signal from a terminal device 472. A signature waveform is generated based on a time-reversed signal of a channel response signal derived from the probe signal 474. Quadrature amplitude modulation is performed on a transmit signal to generate a quadrature amplitude modulated signal 476. A transmission signal is generated based on the quadrature amplitude modulated signal and the signature waveform 478. FIG. 18 is a flow diagram of an example process 480 for time-reversal wireless communication using quadrature amplitude modulation. For example, the process 480 can be implemented by the transmitter 200 (FIG. 7) or 260 (FIG. 8). The process 480 includes performing quadrature amplitude modulation on a first transmit signal to generate a first quadrature amplitude modulated signal 482. Quadrature amplitude modulation is performed on a second transmit signal to generate a second quadrature amplitude modulated signal 484. A first transmission signal is generated based on the first quadrature amplitude modulated signal and a first signature waveform associated with a first terminal device 486. A second transmission signal is generated based on the second quadrature amplitude modulated signal and a second signature waveform associated with a second terminal device 488. A combined transmission signal is generated by adding a real part of the first transmission signal with a real part of the second transmission signal to generate an in-phase part of the combined transmission signal, and adding an imaginary part of the first transmission signal with an imaginary part of the second transmission signal to generate a quadrature part of the combined transmission signal 490.

In some implementations, the waveforms sent from the base station 152 to the terminals 154 can be designed to optimize sum rate by suppressing inter-symbol interference and inter-user interference, as described in U.S. patent application Ser. No. 13/706,342, filed on Dec. 5, 2012, titled "Waveform Design for Time-Reversal Systems," herein incorporated by reference in its entirety. For example, the base station 152 may receive channel response signals derived from probe signals sent from terminal devices 154, in which each probe signal is sent from one of the terminal devices 154 to the base station 152 through multiple propagation paths. The probe signals may be sent during the channel probing phase 170 (FIG. 5). The base station 152 may determine downlink waveforms for the terminal devices 154 to increase a weighted sum-rate under a total power constraint, in which the downlink waveforms are determined based on time-reversed channel response signals and initial virtual uplink power allocation coefficients. The base station 152 may determine updated virtual uplink power allocation coefficients based on the downlink waveforms, and determine downlink power allocation coefficients based on the downlink waveforms and the virtual uplink power allocation coefficients.

The base station 152 may determine virtual uplink signal-to-interference-and-noise ratios (SINRs) based on the virtual uplink power allocation coefficients, and determine the downlink power allocation coefficients based on the virtual uplink SINRs. The virtual uplink SINRs may take into account both inter-symbol interference (ISI) and inter-user interference (IUI). Increasing the weighted sum-rate may also reduce a combination of the inter-symbol interference and the inter-user interference. The base station 152 may transmit a downlink signal derived from a combination of the downlink waveforms and take into account the downlink power allocation coefficients, in which the downlink signal is transmitted to each of the terminal devices 154 through multiple propagation paths. The downlink signal can be configured to enable each terminal device 154 to receive multipath signals that can be used determine a data signal intended for the terminal device 154, in which different terminal devices 154 receive the downlink signal through different propagation paths and determine different data signals, and in which the downlink signal is configured to reduce inter-symbol interference (ISI) and inter-user interference (IUI) for the data signals determined at the terminal devices 154. The base station 152 may determine the downlink waveforms and the virtual uplink power allocation coefficients by iteratively determining updated downlink waveforms based on previously determined virtual uplink power allocation coefficients, and determining updated virtual uplink power allocation coefficients based on previously determined downlink waveforms. The base station 152 may determine downlink waveforms by determining downlink waveforms to maximize the weighted sum-rate under the total power constraint. The base station 152 may determine downlink waveforms by determining minimum mean squared error (MMSE) waveforms.

In some implementations, the complexities of the base station 152 and the terminal devices 154 are asymmetric, such that the base station 152 performs most of the signal processing as both a transmitter (for the downlink) and receiver (for the uplink), allowing the use of low complexity terminal devices 154, as described in U.S. patent application Ser. No. 13/969,271, filed on Aug. 16, 2013, titled "Time-Reversal Wireless Systems Having Asymmetric Architecture," herein incorporated by reference in its entirety.

In some implementations, the multi-user time reversal communication system 150 can use a two-dimensional parallel interference cancellation scheme to enhance the system performance, as described in U.S. patent application Ser. No. 13/969,320, filed on Aug. 16, 2013, titled "Multiuser Time-Reversal Divisional Multiple Access Uplink System with Parallel Interference Cancellation," herein incorporated by reference in its entirety. The two-dimensional parallel interference cancellation scheme uses tentative decisions of detected symbols to effectively cancel the interference in both the time dimension (inter-symbol interference) and the user dimension (inter-user interference), which significantly improves the bit-error-rate performance to achieve a high signal-to-noise-ratio. To further improve the bit error rate performance, a multi-stage processing can be implemented by cascading multiple stages of the proposed two-dimensional interference cancellation, with a total delay that increases linearly with the number of stages, but independent of the number of users.

In some implementations, the base station 152 can be part of a mobile or stationary device. For example, the base station 152 can be implemented as part of a sensor module, a controller, a mobile phone, a laptop computer, or an electronic appliance that communicates wirelessly with multiple other devices. For example, a mobile phone or a laptop computer may communicate simultaneously with a television, a printer, a thermometer, a radio, a refrigerator, a lighting control system, and other devices using the techniques described above.

The wireless time-reversal system 150 can be used to implement the Internet of Things, as described in U.S. patent application Ser. No. 14/202,651, filed on Mar. 10, 2014, titled "Time-Reversal Wireless Paradigm For Internet of Things," herein incorporated by reference in its entirety.

The base station 152 can include one or more processors and one or more computer-readable mediums (e.g., RAM, ROM, SDRAM, hard disk, optical disk, and flash memory). The one or more processors can perform various calculations described above. The calculations can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire and fiber optics.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention. For example, the transmitters 200, 260, and the receiver 340 can include more components that are not shown in the figures. The quadrature amplitude modulation can be, e.g., 4-QAM, 16-QAM, 64-QAM, or 256-QAM. The method of transforming information bits into symbols can be different from what is described above. In the example of FIG. 7, the information bits 202 are separated into a two streams, in which bits at even positions are provided to one stream and bits at odd positions are provided to the other stream. The bits can be separated into two streams using other methods. In this description, quadrature phase shift keying (QPSK) is considered one type of quadrature amplitude modulation, i.e., 4QAM. The time-reversal system 150 can also transmit analog signals. The signature waveform can be a modified version of the time-reversed channel response signal. For example, the signature waveform can be designed to reduce interference. To generate the signature waveform, it is not necessary to first generate a time-reversed signal of the channel response signal. For example, the time-reverse operation may be moved toward a later stage of the process, i.e., design the signature based on the channel response and then time-reverse the resulting signature. Another method of generating the signature waveform is to separate the time-reverse operation into many element-swap operations and distribute these operations in the signature waveform design algorithm.

Accordingly, other embodiments are within the scope of the following claims.

What is claimed is:

1. A method comprising:
  at a base station, receiving a first probe signal from a first terminal device;
  generating a first signature waveform that is based on a first channel response signal derived from the first probe signal;
  at the base station, receiving a second probe signal from a second terminal device;
  generating a second signature waveform that is based on a second channel response signal derived from the second probe signal;
  jointly determining modified first and second signature waveforms to increase a sum rate by suppressing inter-symbol-interference and inter-user-interference;
  performing quadrature amplitude modulation (QAM) on a first transmit signal to generate a first quadrature amplitude modulated signal, the first transmit signal intended to be received by the first terminal device;
  performing quadrature amplitude modulation (QAM) on a second transmit signal to generate a second quadrature amplitude modulated signal, the second transmit signal intended to be received by the second terminal device;
  generating a first transmission signal based on the first quadrature amplitude modulated signal and the first modified signature waveform;
  generating a second transmission signal based on the second quadrature amplitude modulated signal and the second modified signature waveform; and
  generating a combined transmission signal based on the first and second transmission signals.

2. The method of claim 1 in which performing quadrature amplitude modulation on the first transmit signal comprises:
  dividing the first transmit signal into a first part and a second part,
  applying amplitude modulation on the first part to generate an in-phase part of the first quadrature amplitude modulated signal, and
  applying amplitude modulation on the second part to generate a quadrature part of the first quadrature amplitude modulated signal.

3. The method of claim 1 in which the first signature waveform comprises a complex signal having a real part and an imaginary part.

4. The method of claim 1 in which generating a first signature waveform comprises generating a first signature waveform that is based on a time-reversed signal of the first channel response signal.

5. The method of claim 1 in which generating the first transmission signal comprises performing a convolution of the first signature waveform and the first quadrature amplitude modulated signal or a modified version of the first quadrature amplitude modulated signal.

6. The method of claim 5 in which the modified version of the first quadrature amplitude modulated signal comprises an up-sampled version of the first quadrature amplitude modulated signal, and generating the transmission signal comprises performing a convolution of the first signature waveform and the up-sampled version of the first quadrature amplitude modulated signal.

7. The method of claim 1 in which the first transmit signal comprises a first digital transmit signal.

8. The method of claim 7 in which performing the first quadrature amplitude modulation on the first transmit signal comprises encoding data bits of the first transmit signal based on Gray codes, and mapping Gray-coded data bits to quadrature amplitude modulated symbols.

9. The method of claim 1 in which generating the first signature waveform comprises generating a first signature waveform that is based on a time-reversed conjugate signal of the first channel response signal modified to increase the sum rate by suppressing inter-symbol-interference and inter-user-interference.

10. The method of claim 1 in which performing quadrature amplitude modulation on a first transmit signal comprises performing at least one of 4QAM, 16 QAM, 64 QAM, or 256 QAM.

11. An apparatus comprising:
a first device comprising:
an input circuit configured to receive a first probe signal transmitted wirelessly from a second device through a first set of multiple propagation paths, and receive a second probe signal transmitted wirelessly from a third device through a second set of multiple propagation paths; and
a data processor configured to:
generate a first signature waveform that is based on a first channel response signal derived from the first probe signal;
generate a second signature waveform that is based on a second channel response signal derived from the second probe signal; and
jointly determine modified first and second signature waveforms to increase a sum rate by suppressing inter-symbol-interference and inter-user-interference;
perform a first quadrature amplitude modulation (QAM) on a first transmit signal to generate a first quadrature amplitude modulated signal;
perform a second quadrature amplitude modulation (QAM) on a second transmit signal to generate a second quadrature amplitude modulated signal;
generate a first transmission signal based on the first quadrature amplitude modulated signal and the first modified signature waveform;
generate a second transmission signal based on the second quadrature amplitude modulated signal and the second modified signature waveform; and
generate a combined transmission signal based on the first and second transmission signals.

12. The apparatus of claim 11 in which perform quadrature amplitude modulation on the first transmit signal comprises:
divide the first transmit signal into a first part and a second part,
apply amplitude modulation on the first part to generate an in-phase part of the first quadrature amplitude modulated signal, and
apply amplitude modulation on the second part to generate a quadrature part of the first quadrature amplitude modulated signal.

13. The apparatus of claim 11 in which the first signature waveform comprises a complex signal having a real part and an imaginary part.

14. The apparatus of claim 11 in which the data processor is configured to generate the first signature waveform based on a time-reversed signal of the channel response signal.

15. The apparatus of claim 11 in which generate the first transmission signal comprises perform a convolution of the first signature waveform and the first quadrature amplitude modulated signal or a modified version of the first quadrature amplitude modulated signal.

16. The apparatus of claim 15 in which the modified version of the first quadrature amplitude modulated signal comprises an up-sampled version of the first quadrature amplitude modulated signal, and generate the first transmission signal comprises perform a convolution of the first signature waveform and the up-sampled version of the first quadrature amplitude modulated signal.

17. The apparatus of claim 11 in which the first transmit signal comprises a first digital transmit signal.

18. The apparatus of claim 17 in which perform the quadrature amplitude modulation on the first transmit signal comprises encode data bits of the first transmit signal based on Gray codes, and map Gray-coded data bits to quadrature amplitude modulated symbols.

19. The apparatus of claim 11 in which generate the first signature waveform comprises generate a first signature waveform that is based on a time-reversed conjugate signal of the first channel response signal modified to increase the sum rate by suppressing inter-symbol-interference and inter-user-interference.

20. The apparatus of claim 11 in which perform quadrature amplitude modulation on a first transmit signal comprises perform at least one of 4 QAM, 16 QAM, 64 QAM, or 256 QAM.

21. The apparatus of claim 11, further comprising a mobile phone, a car, a boat, an airplane, a robot, an unmanned aerial vehicle, a thermostat, a refrigerator, a lighting control system, a tablet computer, a network router, or a television that includes the first device.

22. The apparatus of claim 11 in which perform quadrature amplitude modulation on the first transmit signal comprises:
divide the first transmit signal into a first part and a second part,
apply an in-phase pulse amplitude modulation (PAM) on the first part to generate an in-phase part of the first quadrature amplitude modulated signal, and
apply a quadrature PAM on the second part to generate a quadrature part of the first quadrature amplitude modulated signal.

23. The apparatus of claim 22 in which generate the first transmission signal comprises:
convolve the in-phase part of the first quadrature amplitude modulated signal with an in-phase part of the first signature waveform to generate a first signal;
convolve the in-phase part of the first quadrature amplitude modulated signal with a quadrature part of the first signature waveform to generate a second signal;
convolve the quadrature part of the first quadrature amplitude modulated signal with the in-phase part of the first signature waveform to generate a third signal;
convolve the quadrature part of the first quadrature amplitude modulated signal with the quadrature part of the first signature waveform to generate a fourth signal;
add the first signal and the fourth signal to generate a fifth signal; and
add the second signal and the third signal to generate a six signal.

24. The apparatus of claim 23 in which perform quadrature amplitude modulation on the second transmit signal comprises:
divide the second transmit signal into a third part and a fourth part,
apply in-phase PAM on the third part to generate an in-phase part of the second quadrature amplitude modulated signal, and
apply quadrature PAM on the fourth part to generate a quadrature part of the second quadrature amplitude modulated signal.

25. The apparatus of claim 24 in which generate the second transmission signal comprises:
convolve the in-phase part of the second quadrature amplitude modulated signal with an in-phase part of the second signature waveform to generate a seventh signal;
convolve the in-phase part of the second quadrature amplitude modulated signal with a quadrature part of the second signature waveform to generate an eighth signal;

convolve the quadrature part of the second quadrature amplitude modulated signal with the in-phase part of the second signature waveform to generate a ninth signal;

convolve the quadrature part of the second quadrature amplitude modulated signal with the quadrature part of the second signature waveform to generate a tenth signal;

add the seventh signal and the tenth signal to generate an eleventh signal; and add the eighth signal and the ninth signal to generate a twelfth signal.

26. The apparatus of claim 25 in which generate the combined transmission signal comprises:

add the fifth signal and the eleventh signal to generate a thirteenth signal; and add the sixth signal and the twelfth signal to generate a fourteenth signal.

\* \* \* \* \*